United States Patent
Kim et al.

(10) Patent No.: US 11,765,003 B2
(45) Date of Patent: Sep. 19, 2023

(54) METHOD OF ADAPTIVELY TRAINING AN EQUALIZER SYSTEM OF PAM-N RECEIVER USING TRAINING DATA PATTERNS

(71) Applicant: UNIVERSITY OF SEOUL INDUSTRY COOPERATION FOUNDATION, Seoul (KR)

(72) Inventors: Yo-Han Kim, Seoul (KR); Soo-Hwan Yoo, Seoul (KR); Jae-Geol Lee, Seoul (KR); Hyeon-Woo Ahn, Seoul (KR); Yongsam Moon, Gwacheon-si (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 17/832,928

(22) Filed: Jun. 6, 2022

(65) Prior Publication Data
US 2023/0246886 A1    Aug. 3, 2023

(30) Foreign Application Priority Data
Feb. 2, 2022   (KR) .................. 10-2022-0017346

(51) Int. Cl.
*H04L 25/03* (2006.01)
*H04B 1/16* (2006.01)
*H04L 27/01* (2006.01)
*H04L 27/38* (2006.01)

(52) U.S. Cl.
CPC ......... *H04L 25/03057* (2013.01); *H04B 1/16* (2013.01); *H04L 27/01* (2013.01); *H04L 27/38* (2013.01)

(58) Field of Classification Search
CPC ... H04L 25/03057; H04L 27/01; H04L 27/38; H04B 1/16
See application file for complete search history.

(56) References Cited

U.S. PATENT DOCUMENTS

| | | | |
|---|---|---|---|
| 9,325,546 B1* | 4/2016 | Mobin | H04L 25/03878 |
| 9,749,162 B1* | 8/2017 | Mobin | H04L 25/03057 |
| 11,611,458 B1* | 3/2023 | Balan | H04L 25/03057 |
| 2022/0217025 A1* | 7/2022 | Wang | H04L 27/02 |

FOREIGN PATENT DOCUMENTS

KR   10-2020-0075343 A   6/2020

OTHER PUBLICATIONS

A 0.18-/spl mu/m CMOS 3.5-gb/s continuous-time adaptive cable equalizer using enhanced low-frequency gain control method, Jong-Sang Choi, et al., IEEE Journal of Solid-State Circuits, vol. 39, Issue 3, Mar. 2004.

* cited by examiner

*Primary Examiner* — Janice N Tieu
(74) *Attorney, Agent, or Firm* — Stein IP, LLC

(57) ABSTRACT

A method of adaptively training an equalizer system of a PAM-N receiver is disclosed. The method of training an equalizer system according to the present invention employs a training pattern including a first training data pattern and second training data pattern to tune the continuous-time linear equalizer, decision feedback equalizer and sampler constituting the equalizer system before use in actual communication enabling long-distance, high-speed communication.

10 Claims, 24 Drawing Sheets

<Prior Art>

<Prior Art>

<Prior Art>

<Prior Art>

<Prior Art>

<Prior Art>

<Prior Art>

<Prior Art>

<Prior Art>

<Prior Art>

<Prior Art>

<Prior Art>

METHOD OF ADAPTIVELY TRAINING AN EQUALIZER SYSTEM OF PAM-N RECEIVER USING TRAINING DATA PATTERNS

This non-provisional U.S. patent application claims priority under 35 U.S.C. § 119 of Korean Patent Application No. 10-2022-0017346 filed on Feb. 10, 2022, in the Korean Intellectual Property Office, the entire contents of which are hereby incorporated by reference.

1. FIELD

The present invention relates to a method of training an equalizer system of a PAM-N receiver, and in particular, to a method of adaptively training an equalizer system of a PAM-N receiver using a training data pattern.

2. DESCRIPTION OF THE RELATED ART

Various methods are used in order to transmit digital signals at high speed. While binary data are transmitted conventionally, multi-level pulse amplitude modulation (PAM) has been proposed to transmit digital data at high speed.

FIG. 1A through FIG. 1D are diagrams illustrating waveforms of binary PAM (PAM-2) and multi-level PAM (PAM-4, PAM-8 and PAM-N) respectively.

FIG. 1A illustrates binary data having values '0' and '1', That is, in FIG. 1A, a two-level PAM (PAM-2) signal is illustrated. While PAM-2 signal is robust to noise. PAM-2 has a limitation in increasing signal data rate.

In order to overcome the limitation of PAM-2. PAM-4, PAM-8 and PAM-N have been proposed.

As shown in FIG. 1B, in PAM-4, data having values of '00', '01', '10' and '11' are modulated into a signal with four data levels.

Similarly, as shown in FIG. 1C, in PAM-8, data having values of '000', '001', '010', '011', '100', '101', '110' and '111' are modulated into a signal with eight data levels.

Similarly, as shown in FIG. 1D, in PAM-N, data having values of '00 . . . 00', '00-01', —, '11 . . . 11' are modulated into a signal with N data levels. Here, N is a natural number, and typically, satisfies $N=2^n$ (where n is a natural number). If $N=2^n$, one pulse contains n bits of data. However, N is not limited to a natural number that satisfies $N=2^i$.

As a result, in PAM-4, PAM-8 and PAM-N, data may be transmitted at two, three and n (when $N=2^n$) times faster compared to PAM-2, respectively. However, PAM-4, PAM-8 and PAM-N are more susceptible to attenuation and noise when compared to PAM-2. Therefore, an equalizer capable of equalizing the received signal is necessary in PAM-4, PAM-S and PAM-N.

FIG. 2 is a block diagram illustrating a conventional PAM-N receiver.

Referring to FIG. 2, the conventional PAM-N receiver 100 includes a continuous-time linear equalizer (CITE) 110 and decision feedback equalizer (DFE) 120.

The CTLE 110 equalizes the received signal.

FIG. 3 is a circuit diagram illustrating the CTLE 110 shown in FIG. 2 in detail.

Referring to FIG. 3, the CTLE 110 is basically a differential amplifier circuit, and includes a capacitor $C_s$ and a resistor $R_s$ connected in parallel between the sources of the transistors.

The amplification gain of a high-frequency component (high-frequency amplification gain) of the received signal is determined by the capacitance of the capacitor $C_s$, and the amplification gain of a low-frequency component (low-frequency amplification gain) of the received signal is determined by the resistance of the resistor $R_s$.

The capacitance of the capacitor $C_s$ and the resistance of the resistor $R_s$ may be selected according to the degree of attenuation of the received signal.

FIG. 4 is a diagram illustrating a waveform of a signal $CTLE_{OUT}$ outputted by the CTLE 110 according to the capacitance of the capacitor $C_s$ and the resistance of the resistor $R_s$.

Referring to FIG. 4, when the transmitted data '00', '00', '11', '11', '11', '11', '00', '00' are not equalized (meaning $C_s=0$) after receiving the same, the signal $CTLE_{OUT}$ having a waveform denoted as (i) in FIG. 4 is obtained due to the attenuation of the high-frequency (HF) component.

When only the capacitance of the capacitor $C_s$ is increased (referred to as "normal $C_s$") with respect to (i) in FIG. 4, a signal $CTLE_{OUT}$ having a waveform denoted as (ii) in FIG. 4 is obtained with an increase in the HF component.

When only the capacitance of the capacitor $C_s$ is further increased (referred to as "large $C_s$") with respect to (ii) in FIG. 4, a signal $CTLE_{OUT}$ having a waveform denoted as (iii) in FIG. 4 is obtained with a more increase in the HF component.

When the resistance of the resistor R is increased (referred to as "large $R_s$") with respect to (iii) in FIG. 4, a signal $CTLE_{OUT}$ having a waveform denoted as (iv) in FIG. 4 is obtained with a decrease in the low-frequency (LF) component. The signal $CTLE_{OUT}$ denoted as (iii) in FIG. 4 is shown in dotted line for comparison.

When the resistance of the resistor $R_s$ is decreased (referred to as "small $R_s$") with respect to (iii) in FIG. 4, a signal $CTLE_{OUT}$ having a waveform denoted as (v) in FIG. 4 is obtained with an increase in the LF component. The signal $CTLE_{OUT}$ denoted as (iii) in FIG. 4 is shown in dotted line for comparison.

Here. (ii) in FIG. 4 represents and under-equalization, and (iii), (iv) and (v) in FIG. 4 represent over-equalizations. As shown, the HF component increases by equalization as the capacitance of the capacitor $C_s$ increases, and the LF component decreases by equalization as the resistance of the resistor $R_s$ increases.

Therefore, by adjusting the capacitance of the capacitor $C_s$ of the CTLE 110 and the resistance of the resistor R the HF amplification gain and the LF amplification gain may be adjusted, respectively, and the received signal may also be properly equalized by adjusting the HF amplification gain and the LF amplification gain.

The DFE 120 equalizes the signal $CTLE_{OUT}$ outputted by the CTLE 110, which will be described in detail as follows.

FIG. 5 is a diagram schematically illustrating a waveform of a received signal having distortion therein. Referring to FIG. 5, when a pulse having a width of $T_b$ is transmitted through a lossy channel (e.g., a signal transmission cable, etc.), a distorted signal $x_n$ is received at the receiving stage. As exemplified, the received signal $x_n$ gradually rises from $t=-T_b$ and reaches $C_0$ (main Cursor) at $t=0$ due to the low-pass filter characteristic of the lossy channel. The signal $x_n$ gradually decreases from $t=0$ and reaches $C_1$ (post-cursor) at $t=T_b$ and $C_2$ (post-cursor) at $t=2T_b$. That is, the signal $x_n$ does not reach 0 even at $t=2T_b$.

This phenomenon is referred to as ISI (Inter-Symbol interference), and the ISI results in a previous data bit affecting the current data bit.

In order to solve the ISI, a decision feedback equalizer has been proposed.

FIG. 6A is a block diagram illustrating a 1-tap decision feedback equalizer 1-tap (HT) according to prior art.

Referring to FIG. 6A, the 1-tap decision feedback equalizer includes an adder 10, a slicer 20, a flip-flop (FF) 30 and a multiplier 40.

The level of the signal $x_n$ received through the lossy channel illustrated in FIG. 5 is determined by the slicer 20. The signal having the level thereof determined is delayed by the FF 30 and then negatively fed-back via the multiplier 40. The signal $d_F$ which is negatively fed-back removes the post-cursor of the signal $x_n$.

A more detailed description will be given below.

Assuming that the initial value of signal $d_F$ is 0, $x_n$ is equal to $d_n$. The slicer 20 removes the amplitude noise from the signal $d_n$, and the signal $d_n$ with its amplitude noise removed is outputted as the signal $ds_n$. While the signal d is actually an analog signal due to the lossy channel, the signal $ds_n$ is a digital signal. That is, the signal $ds_n$ is '0' or '1'. In addition, as the signal $ds_n$ may represent the sign of the signal $d_n$, this can be denoted as $ds_n$=sgn $d_n$. That is, the signal $ds_n$ may be referred to as "sign $ds_n$," and may have a value of '−1' (='0') or '+1' (='1'). Hereinafter, it is assumed that $ds_n$=−1 or $ds_n$+1.

The signal $ds_n$ is delayed by one period by FF (30). That is, the FF 30 outputs signal $ds_{n-1}$, which is a signal one period prior to the signal $ds_n$. The multiplier 40 outputs the signal $d_F$ obtained by multiplying the signal $ds_{n-1}$ by the tap coefficient $C_1$. The signal $d_F$ is negatively fed-back to remove the post-cursor of the signal $x_n$.

In the 1-tap decision feedback equalizer, in order to obtain optimal performance, the sampling edge of the clock should occur at the point where the output of the adder 10 has a maximum value, and the tap coefficient $C_1$ should be determined according to the actual channel response.

FIG. 6B is a diagram illustrating a signal $d_n$ from which a post-cursor is partially removed. Referring to FIG. 6B, the post-cursor at $t=T_b$ is removed (i.e., $d_n=x_n-C_1\times ds_{n-1}$). However, the post-cursor at $t=2T_b$ is not removed.

A 2-tap decision feedback equalizer is proposed in order to remove the post-cursor at $t=2T_b$.

FIG. 7A is a block diagram illustrating a 2-tap decision feedback equalizer according to prior art.

Referring to FIG. 7A, the 2-tap decision feedback equalizer includes an adder 10, a slicer 20, flip-flops (FFs) 30a and 30b and multipliers 40a and 40b. The 2-tap decision feedback equalizer further includes the FF 30b and the multiplier 40b compared to the 1-tap decision feedback equalizer shown in FIG. 6A.

The operation of the 2-tap decision feedback equalizer shown in FIG. 7A is substantially the same as that of the 1-tap decision feedback equalizer shown in FIG. 6A. Specifically, assuming that the rising edge of the clock occurs at a time multiple of $T_b$ such as $t=0$, $T_b$, $2T_b$, etc., and the sum of delay of FF and delay of feedback loop is approximately $T_b/2$, $ds_{n-1}=1$ is satisfied from $t=T_b/2$ to $t=3T_b/2$, and $ds_{n-2}=1$ is satisfied from $t=3T_b/2$ to $t=5T_b/2$. Therefore, $d_n=x_n-ds_{n-1}\times C_1$ is satisfied from $t=T_b/2$ to $t=3T_b/2$, and $d_n=x_n-ds_{n-2}\times C_2$ is satisfied from $t=3T_b/2$ to $t=5T_b/2$. As a result, the signal $d_n$ with the post-cursors at $t=T_b$ and $t=2T_b$ removed is obtained as shown in FIG. 7B.

The DFE 120 may include three or more taps, and the DFE 120 including three or more taps operates in the same manner as described above.

As described above, the degree of removing the post-cursor is determined by the tap coefficient of the DFE 120. That is, when the tap coefficient is properly selected, an accurate signal with the post-cursor thereof removed may be obtained from the received signal.

The equalizer system of the PAM-4 receiver according to the prior art cannot adaptively select the high-frequency amplification gain and low-frequency amplification gain of the CUE, and the tap coefficients of the DFE depending on the state of the received signal and the characteristics of the transmission line. As a result, proper equalization depending on the state of the received signal cannot be expected.

SUMMARY OF THE INVENTION

It is an object of the present invention to provide a method of adaptively training an equalizer system of a PAM-N receiver using a training data pattern.

In order to achieve the object of the present invention, there is provided a method of training an equalizer system of a PAM-N receiver comprising a linear equalizer equalizing a received signal and a decision feedback equalizer equalizing an output signal of the linear equalizer, the method comprising: (a) receiving and equalizing a first training pattern and a second training pattern, wherein the first training pattern comprises a first data '00 . . . 00', a data '11 . . . 11' and a second data '00 . . . 00' arranged in order, and the second training pattern comprises a first data '11 . . . 11' through a $K^{th}$ data '11 . . . 11' consecutively arranged after the second data '00 . . . 00' (where K is a natural number equal to or greater than 2); (b) generating an updated data level upper limit $UDLV_{NH}$ and an updated data level lower limit $UDLV_{NL}$ by increasing or decreasing a data level upper limit $DLV_{NH}$ based on a result of a comparison between: a first level of an output signal $DFE_{OUT}$ of the decision feedback equalizer corresponding to the data '11 . . . 11' of the first training pattern; and the data level upper limit $DLV_{NH}$; (c) increasing or decreasing a high-frequency amplification gain of the linear equalizer based on a result of a comparison between: a second level of an output signal $DFE_{OUT}$ of the decision feedback equalizer corresponding to the first data '11 . . . 11.'; and the updated data level upper limit $UDLV_{NH}$ when a transition from the second data '00 . . . 00' to the first data '11 . . . 11' occurs; and (d) increasing or decreasing a low-frequency amplification gain of the linear equalizer based on a result of a comparison between: a third level of an output signal $DFE_{OUT}$ of the decision feedback equalizer corresponding to the second data '11 . . . 11' through the $K^{th}$ data '11 . . . 11'; and the updated data level lower limit $UDLV_{NH}$.

It is preferable that (b) comprises: (b-1) increasing the data level upper limit $DLV_{NH}$ to generate the updated data level upper limit $UDLV_{NH}$ when the first level is greater than the data level upper limit $DLV_{NH}$ (b-2) decreasing the data level upper limit $DLV_{NH}$ to generate the updated data level upper limit $UDLV_{NH}$ when the first level is smaller than the data level upper limit $DLV_{NH}$; and (b-3) generating the updated data level lower limit $UDLV_{NH}$ from the updated data level upper limit $UDLV_{NH}$.

It is preferable that (c) comprises: (c-1) decreasing the high-frequency amplification gain of the linear equalizer when the second level is greater than the updated data level upper limit $UDLV_{NH}$ when the transition occurs; and (c-2) increasing the high-frequency amplification gain of the linear equalizer when the second level is smaller than the updated data level upper limit $UDLV_{NH}$ when the transition occurs.

It is preferable that (d) comprises: (d-1) decreasing the low-frequency amplification gain of the linear equalizer when the third level is greater than the updated data level lower limit $UDLV_{NH}$; and (d-2) increasing the low-frequency amplification gain of the linear equalizer when the third level is smaller than the updated data level lower limit $UDLV_{NH}$.

The method of training an equalizer system according to the present invention may further comprise: increasing or decreasing a tap coefficient of the decision feedback equalizer based on a result of a comparison between: a fourth level of an output signal $DFE_{OUT}$ of the decision feedback equalizer corresponding to one or more data '11 . . . 11' selected from the first data '11 . . . 11' through the $K^{th}$ data '11 . . . 11' of the second training pattern; and the updated data level lower limit $UDLV_{NH}$.

It is preferable that the decision feedback equalizer comprises a 2-tap decision feedback equalizer, the one or more data '11 . . . 11' comprise an fill data '11 . . . 11' and (e) comprises: (e-1) increasing or decreasing tap coefficients $C_1$ and $C_2$ based on a result of comparison between: a level of an output signal $DFE_{OUT}$ of the decision feedback equalizer corresponding to the $L^{th}$ data '11 . . . 11'; and the updated data level lower limit $UDLV_{NH}$ (where L is a natural number satisfying 1≤L≤K).

It is preferable that the one or more data '11 . . . 11' further comprise an $M^{th}$ data '11 . . . 11', and (e) further comprises: (e-2) increasing or decreasing tap coefficients $C_1$ and $C_2$ based on a result of comparison between: a level of an output signal $DFE_{OUT}$ of the decision feedback equalizer corresponding to the $M^{th}$ data '11 . . . 11'; and the updated data level lower limit $UDLV_{NH}$, (where L≠M and M is a natural number satisfying 1≤M≤K).

The method of training an equalizer system according to the present invention may further comprise: (f) calculating a first initial data level $IDL_1$ through an $N^{th}$ initial data level $IDL_N$ from the updated data level upper limit $UDLV_{NH}$ and the updated data level lower limit $UDLV_{NL}$; and (g) calculating a first initial threshold voltage $IV_{TH1}$ through an $(N-1)^{th}$ initial threshold voltage $IV_{TH(N-1)}$ from the first initial data level $IDL_1$ through the $N^{th}$ initial data level DAN.

It is preferable that (f) comprises: (f-1) calculating the $N^{th}$ initial data level $IDL_N$ from an average value of the updated data level upper limit $UDLV_{NH}$ and the updated data level lower limit $UDLV_{NH}$; and (f-2) calculating the first initial data level $IDL_1$ through $(N-1)^{th}$ initial data level $IDL_{(N-1)}$ by dividing the $N^{th}$ initial data level IDL into (N-1) equal intervals.

It is preferable that (g) comprises: calculating the first initial threshold voltage $IV_{TH1}$ through the $(N-1)^{th}$ initial threshold voltage $IV_{TH(N-1)}$ from the first initial data level $IDL_1$ through the $N^{th}$ initial data level $IDL_N$ according to equation $$IV_{THj} = \frac{IDL_j + IDL_{(j+1)}}{2},$$

where j is a natural number satisfying 1≤j≤(N-1).

DETAILED DESCRIPTION OF THE PREFERRED EMBODIMENTS

Hereinafter, a method of training an equalizer system according to the present invention will be described in detail with reference to the accompanying drawings.

Figure 8:
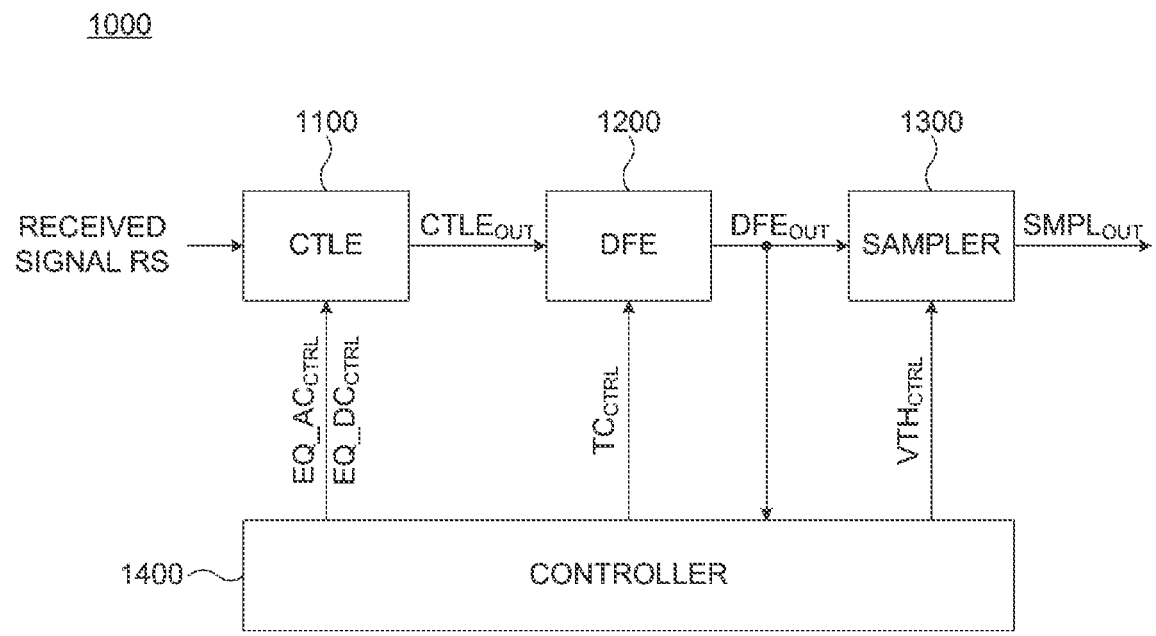
FIG. 8 is a block diagram illustrating an equalizer system of a PAM-N receiver according to the present invention.

FIG. 8 is a block diagram illustrating an equalizer system of a PAM-N receiver according to the present invention.

Referring to FIG. 8, an equalizer system 1000 of a PAM-N receiver according to the present invention comprises a continuous-time linear equalizer ("CTLE") 1100, a decision feedback equalizer ("DFE") 1200 and a controller 1400. The equalizer system 1000 of the PAM-N receiver according to the present invention may further include a sampler 1300.

The CTLE 1100 equalizes the received signal RS.

Specifically, the CTLE 1100 adjusts a high-frequency amplification gain ("HF amplification gain" hereinafter) and a low-frequency amplification gain ("LF amplification gain" hereinafter) according to a high-frequency amplification gain control signal EQ_AC$_{CTRL}$ ("HF amplification gain control signal a) EQ_AC$_{CTRL}$" hereinafter) and a low-frequency amplification gain control signal EQ_AC$_{CTRL}$ ("LF amplification gain control signal EQ_AC$_{CTRL}$" hereinafter) transmitted from the controller 1400, respectively, and outputs an equalized signal CTLE$_{OUT}$ obtained by equalizing the signal RS according to the adjusted HF amplification gain and the adjusted LF amplification gain. The equalized signal CTLE$_{OUT}$ is inputted to the DFE 11200.

When a PAM-N transmitter transmits data '11 . . . 11' over a transmission line, a data level of the received data '11 . . . 11' is different from that of the transmitted data '11 . . . 11'. This is due to a distortion present in the received data '11 . . . 11' caused by the characteristics of the transmission line.

Figure 1A:
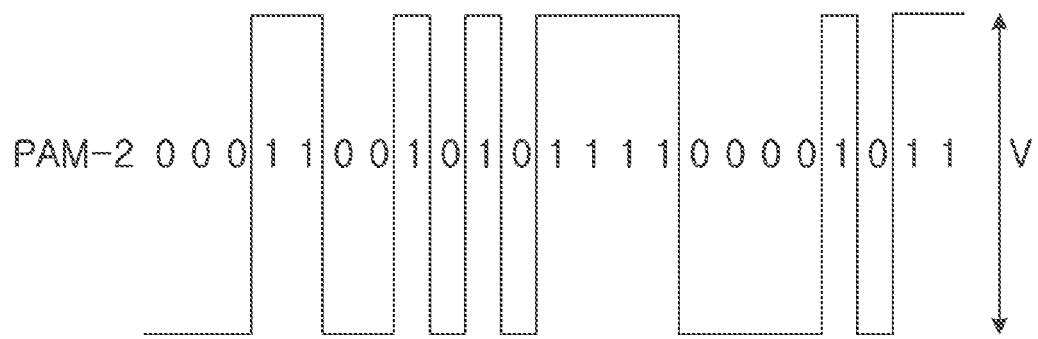
FIGS. 1A through 1D are diagrams illustrating binary PAM (PAM-2) and multi-level PAM (PAM-4, PAM-8 and PAM-N) signals, respectively.
Figure 1B:
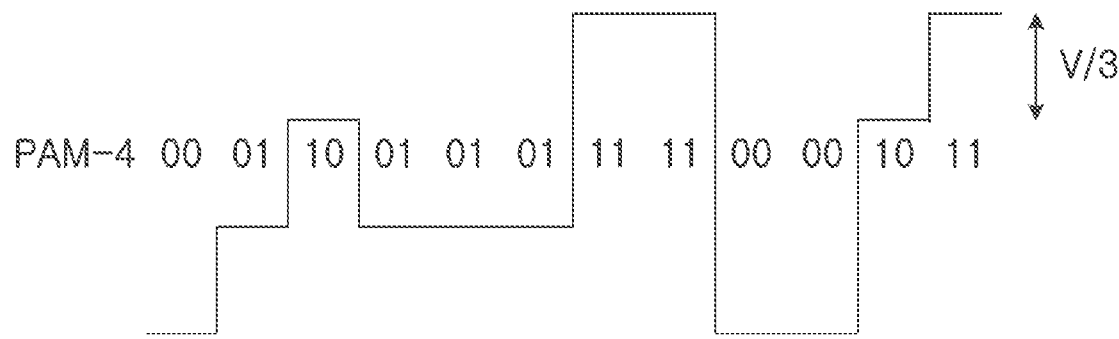
Figure 1C:
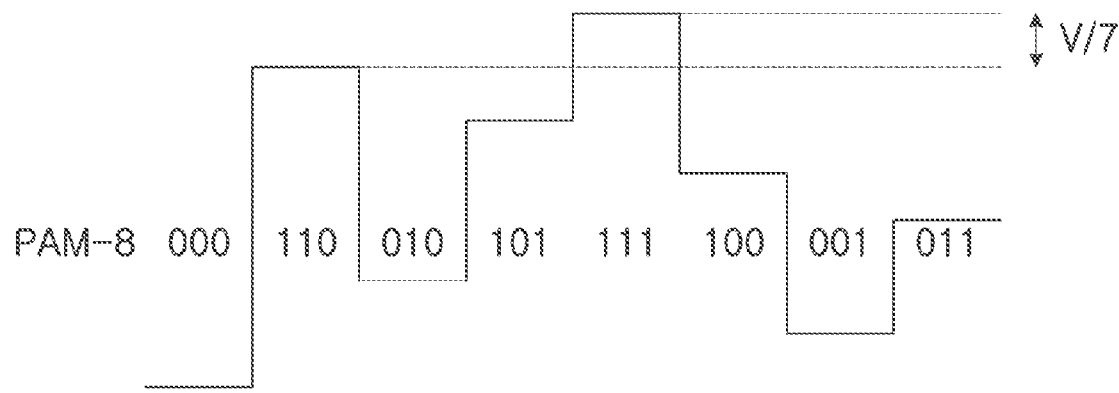
Figure 1D:
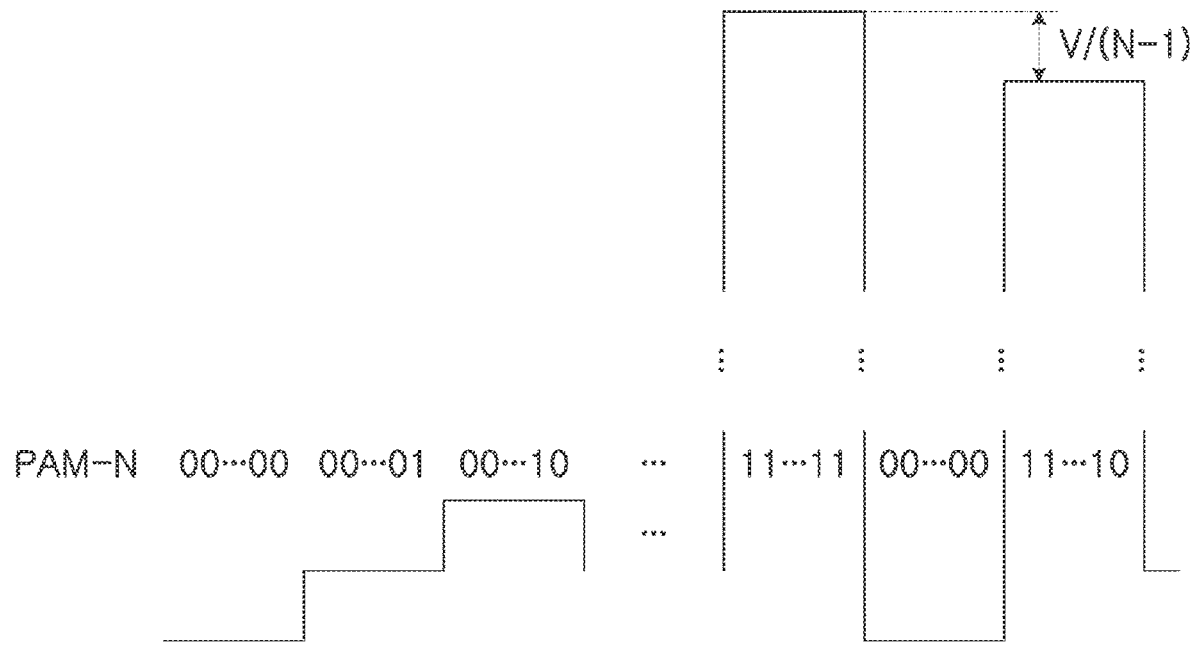
Figure 2:
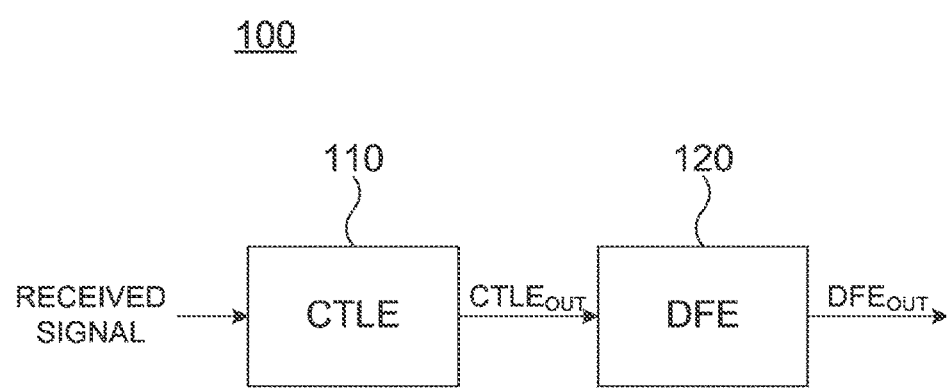
FIG. 2 is a block diagram illustrating an equalizer system of a PAM-N receiver according to prior art.
Figure 3:
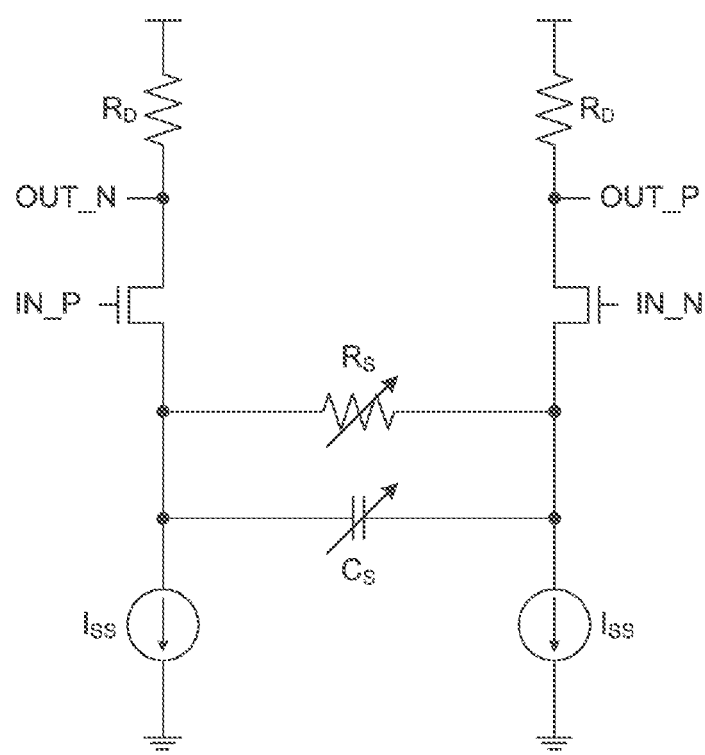
FIG. 3 is a circuit diagram illustrating a CTLE of FIG. 2 in detail.
Figure 4:
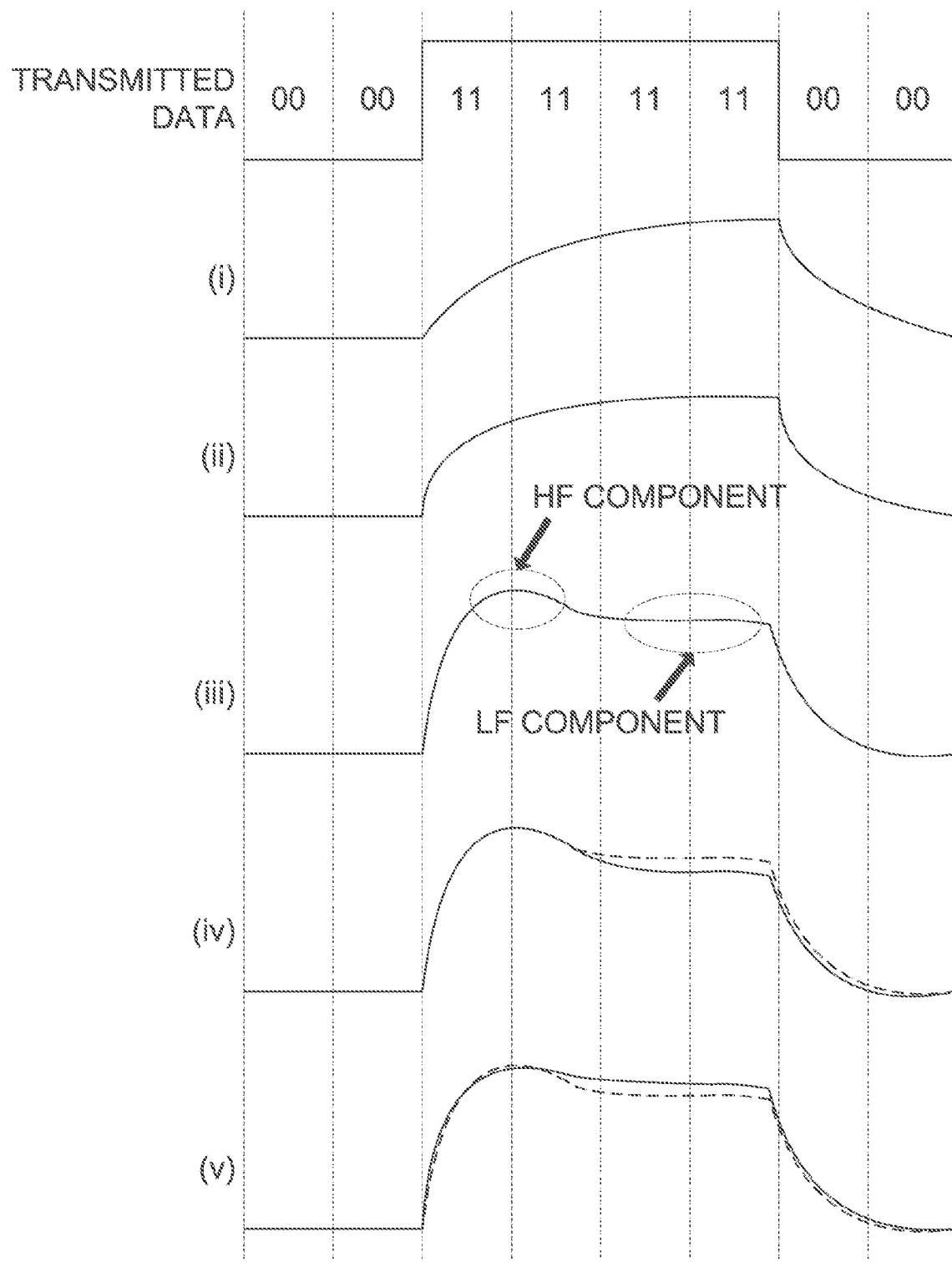
FIG. 4 is a diagram illustrating a waveform of a signal $CTLE_{OUT}$ according to $C_s$ and $R_s$.
Figure 5:
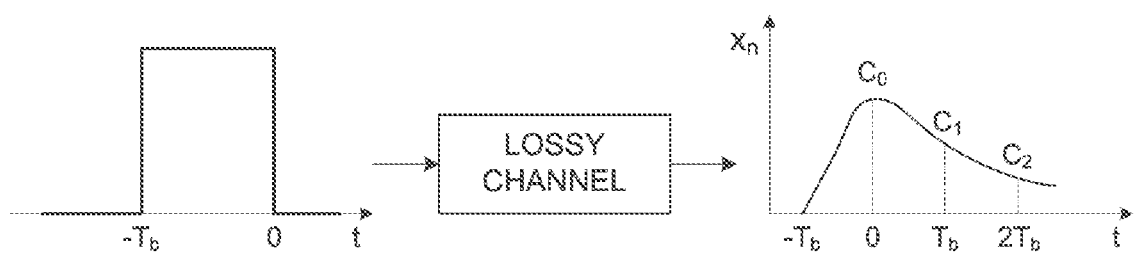
FIG. 5 is a waveform diagram illustrating a signal distortion generated in a PAM-N receiver according to prior art.

A difference in the waveforms of transmitted data '11 . . . 11' and received data '11 . . . 11' also exists as described with reference to FIGS. 4 and 5 in addition to the difference in the data levels.

This will be described in more detail with reference to FIG. 10.

Figure 10:
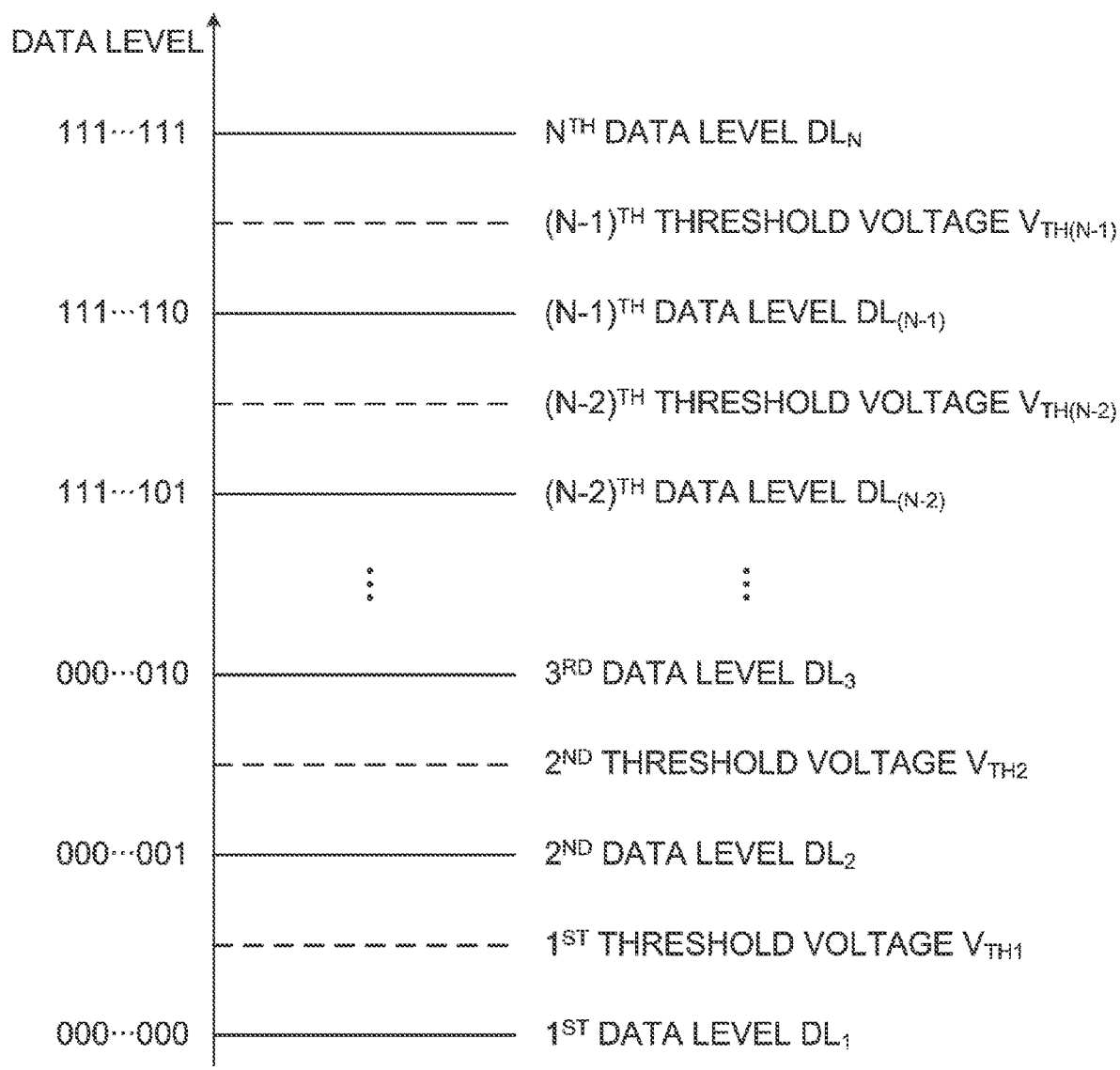
FIG. 10 is a diagram illustrating transmitted data, data levels of received data and threshold voltages of a PAM-N signal.

FIG. 10 is a diagram illustrating the transmitted data ('000 . . . 000', '000 . . . 001', '000 . . . 010', . . . , '111-101', '111 . . . 110', '111 . . . 111') and the data levels of the received data of a PAM-N signal.

Referring to FIG. 10, when the transmitter transmits data '000 . . . 000', data '000 . . . 001', data '000 . . . 010', . . . , data '111 . . . 101' data '111 . . . 110' and data '111 . . . 111' over the transmission line, the levels of the received data corresponding to transmitted data '000 . . . 000', 000 . . . 001', '000 . . . 010', . . . , '111 . . . 101', '111 . . . 110' and '111 . . . 111' are a first data level DL$_1$, a second data level DL$_2$, a third data level DL$_3$, . . . , a (N–2)$^{th}$ data level DL$_{(N-2)}$, (N–1)$^{th}$ data level DL$_{(N-1)}$, and N$^{th}$ data level DL$_N$, respectively (where N is a natural number). Here, each data level of the received signal may be greater than, less than, or equal to corresponding data level of the transmitted data. That is, as described above, the data level of the received signal may be the same as or different from that of the transmitted data due to the factors such as transmission line characteristics and ISI.

Moreover, the received data does not have a fixed level. For example, when the transmitter transmits data '111 . . . 111', the received data corresponding to the transmitted data '111 . . . 111' does not have a fixed level or a constant level for each data received. That is, when the transmitter repeatedly transmits data '111 . . . 111', the levels of the received data may vary within a certain range due to ISI, etc such that the levels differ from one another even when the transmitted data are the same. When the level of the received data corresponding to the transmitted data. '111 . . . 111' is within the certain range, the received data is determined to have Na' data level DL$_N$.

The CTLE 1100 equalizes the received signal such that the level of the received data is within a predetermined range. For example, the CTLE 1100 equalizes the received signal in a manner that the level of the received data corresponding to transmitted data '111 . . . 111' exists between a predetermined data level upper limit and a predetermined data level lower limit.

Figure 11:
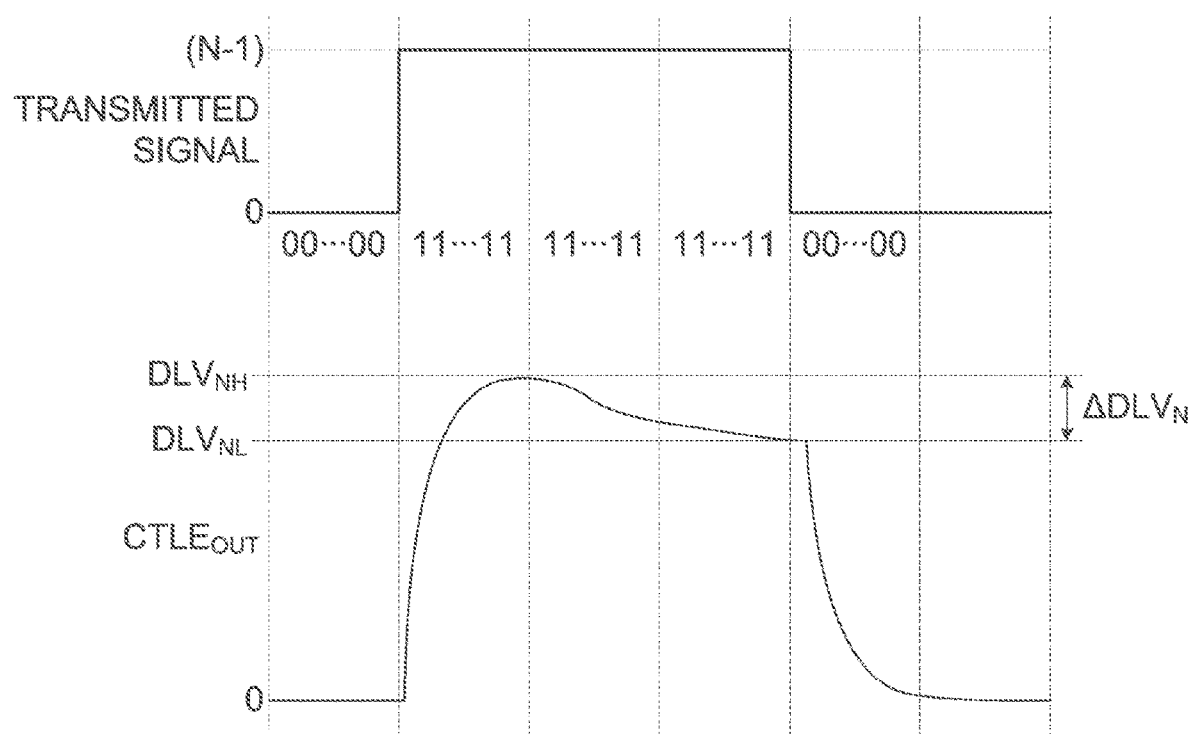
FIG. 11 is a waveform diagram illustrating a data level upper limit and a data level lower limit of an equalizer system according to the present invention.

FIG. 11 is a waveform diagram illustrating a data level upper limit and a data level lower limit of the equalizer system 1000 according to the present invention.

Referring to FIG. 11, when data '11 . . . 11' transmitted by the transmitter is received, the CTLE 1100 equalizes the received signal RS such that the data level DL$_N$ corresponding to the received data '11 . . . 11' is between to a data level upper limit DLV$_{NH}$ a data level lower limit DLV$_{NL}$.

Here, the data level upper limit DLV$_{NH}$ and the data level lower limit DLV$_{NL}$ satisfy Equation 1 below.

DLV$_{NH}$–DLV$_{NL}$=ΔDLV$_N$(where ΔDLV$_N$≥0) [Equation 1]

That is, the difference ΔDLV$_N$ between the data level upper limit DLV$_{NH}$ and the data level lower limit DLV$_{NL}$ is constant. Therefore, when the data level upper limit DLV$_{NH}$ is determined, the data level lower limit DLV$_{NL}$ can be determined by equation 1, and when the data level upper limit DLV$_{NH}$ is varied, the data level lower limit DLV$_{NL}$ also varies according to equation 1.

As described above, the CTLE 1100 equalizes the received signal such that each data level of the received signal is between the data level upper limit DLV$_{NH}$ and the data level lower limit DLV$_{NL}$. Here, the degree of equalization by the CTLE 1100 is determined according to the HF amplification gain and the LF amplification gain which are adjusted by the HF amplification gain control signal EQ_AC$_{CTRL}$ and the LF amplification gain control signal EQ_DC$_{CTRL}$ transmitted by the controller 1400, respectively.

Referring back to FIG. 8, the DFE 1200 receives and equalizes the signal CTLE$_{OUT}$ outputted from the CTLE 1100.

Figure 6A:
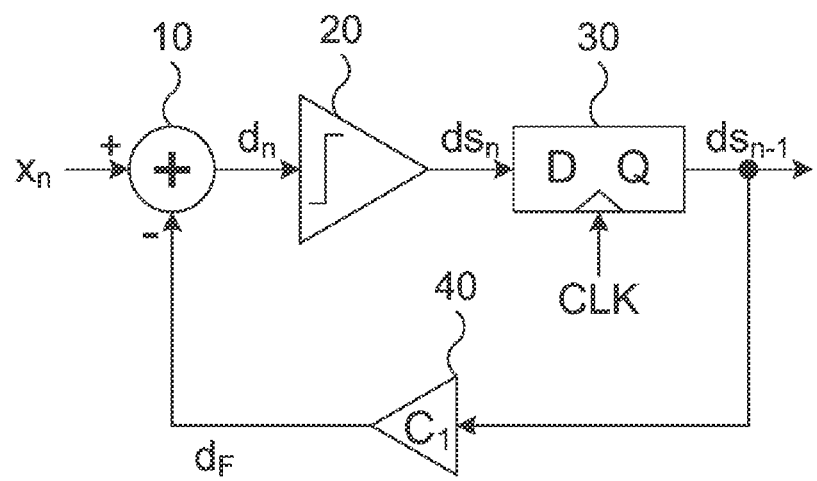
FIG. 6A is a block diagram illustrating a 1-tap decision feedback equalizer (1-tap DFE) according to prior art.
Figure 6B:
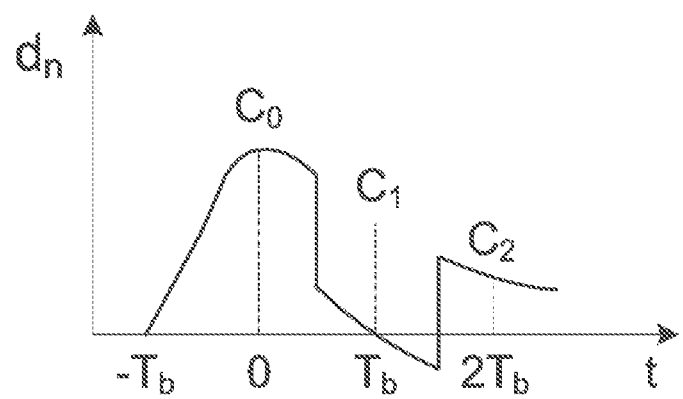
FIG. 6B is a waveform diagram illustrating a signal $d_n$ with a post-cursor thereof partially removed.
Figure 7A:
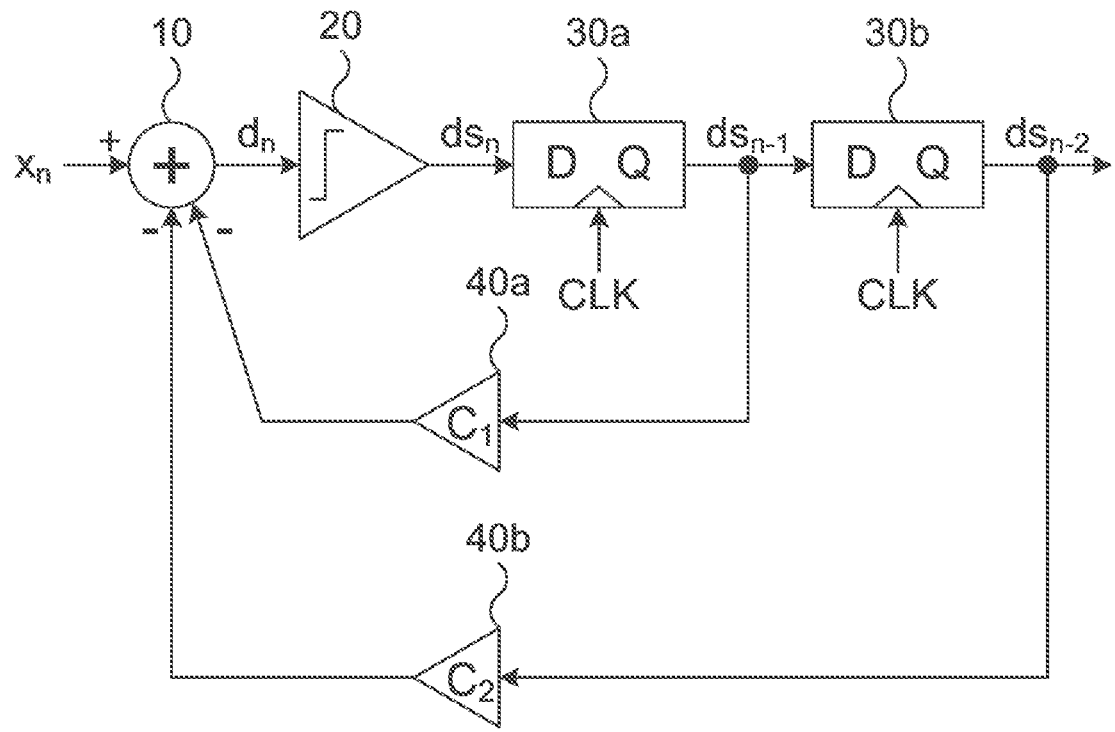
FIG. 7A is a block diagram illustrating a 2-tap decision feedback equalizer (2-tap DFE) according to prior art.

Specifically, the DFE 1200 adjusts tap coefficients (e.g., C$_1$ of FIG. 6A or C$_1$ and C$_2$ of FIG. 7A) according to a tap coefficient control signal TC$_{CTRL}$ transmitted from the controller 1400, and outputs a signal DFE$_{OUT}$ obtained by equalizing the signal CTLE$_{OUT}$ according to the adjusted tap coefficients. The signal DFE$_{OUT}$ is inputted to the controller 1400.

The sampler 1300 samples the signal DTE$_{OUT}$.

Specifically, the sampler 1300 samples the signal DFE$_{OUT}$ according to the threshold voltage control signal VTH$_{CTRL}$ transmitted from the controller 1400, and outputs the sampled signal as a signal SMPL$_{OUT}$.

Figure 12A:
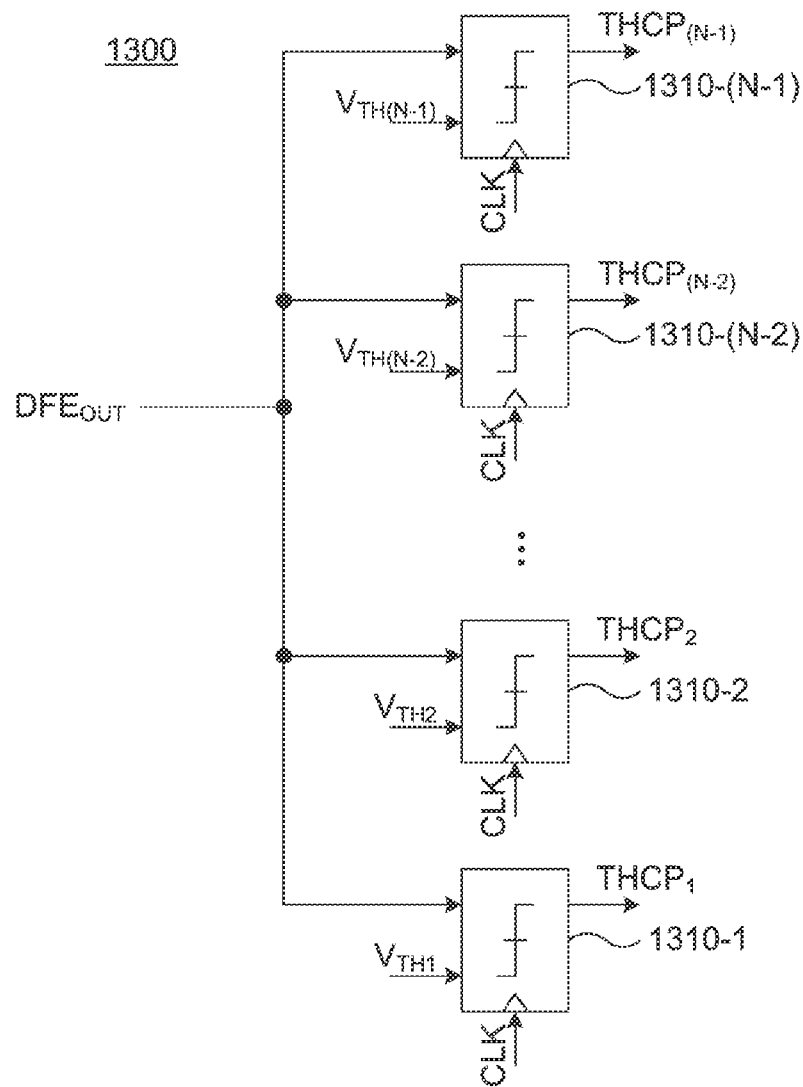
FIGS. 12A and 12B are block diagrams illustrating a sampler of an equalizer system according to the present invention.
Figure 12B:
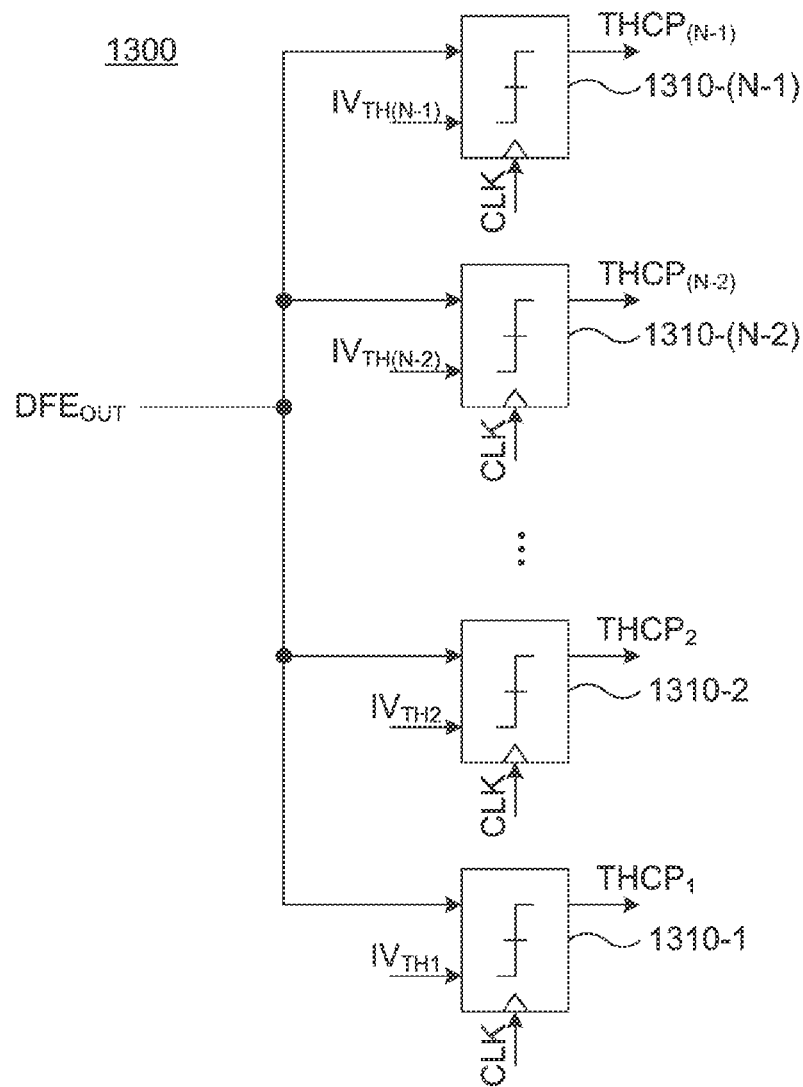

FIGS. 12A and 12B are block diagrams illustrating a sampler of an equalizer system according to the present invention.

The sampler 1300 determines the data level of the received signal based on the threshold voltages shown in FIG. 10. For example, when the level of the received signal is greater than (N–1)$^{th}$ threshold voltage V$_{TH(N-1)}$, the data level of the received signal is determined as N$^{th}$ data level DL$_N$. In another example, when the level of the received signal is greater than the first threshold voltage V$_{TH1}$ and less than the second threshold voltage V$_{TH2}$, the data level of the received signal is determined as the second data level DL$_2$.

Specifically, referring to FIG. 12A, the sampler 1300 includes a first data level comparator 1310-1 through an (N–1)$^{th}$ data level comparator 1310-(N–1).

The first data level comparator 1310-1 through the (N–1)$^{th}$ data level comparator 1310-(N–1) compare the signal DFE$_{OUT}$ to first threshold voltage V$_{TH1}$ through (N–1)$^{th}$ threshold voltage V$_{TH(N-1)}$, respectively.

More specifically, the first data level comparator 1310-1 compares the signal DFE$_{OUT}$ with the first threshold voltage V$_{TH1}$ and outputs a signal THCP$_1$ that indicates which one of the signal DFE$_{OUT}$ and the first threshold voltage V$_{TH1}$ is greater. Specifically, when the level of the signal DFE$_{OUT}$ is greater than the first threshold voltage V$_{TH1}$, THCP$_1$=1 is outputted, and when the level of the signal DFE$_{OUT}$ is smaller than the first threshold voltage V$_{TH1}$, THCP$_1$=0 is outputted.

The second data level comparator 1310-2 compares the signal $DFE_{OUT}$ with the second threshold voltage $V_{TH2}$ and outputs a signal $THCP_2$ that indicates which one of the signal $DFE_{OUT}$ and the second threshold voltage $V_{TH2}$ is greater. Specifically, when the level of the signal $DFE_{OUT}$ is greater than the second threshold voltage $V_{TH2}$, $THCP_2=1$ is output, and when the level of the signal $DFE_{OUT}$ is smaller than the second threshold voltage $V_{TH2}$, $THCP_2=0$ is outputted.

Similarly, the $(N-2)^{th}$ data level comparator 1310-(N-2) outputs $THCP_{(N-2)}=1$ or $THCP_{(N-2)}=0$ depending on which one of the signal $DFE_{OUT}$ and the $(N-2)^{th}$ threshold voltage $V_{TH(N-2)}$ is greater, and the $(N-1)^{th}$ data level comparator 1310-(N-1) outputs $THCP_{(N-1)}=1$ or $THCP_{(N-1)}=0$ depending on which one of the signal $DFE_{OUT}$ and the $(N-1)^{th}$ threshold voltage $V_{TH(N-1)}$ is greater.

The level of the data included in the signal $DFE_{OUT}$ may be determined from the signal $THCP_1$ through the signal $THCP_{(N-1)}$ outputted by the first data level comparator 1310-1 through the $(N-1)^{th}$ data level comparator 1310-(N-1), respectively. For example, when each of the signal $THCP_1$ through the signal $THCP_{(N-1)}$ outputted by the first data level comparator 1310-1 through $(N-1)^{th}$ data level comparator 1310-(N-1) is '1', the level of the data included in the signal $DFE_{OUT}$ may be determined as the $N^{th}$ data level $DL_N$ and when each of the signal $THCP_1$ through the signal $THCP_{(N-1)}$ outputted by the first data level comparator 1310-1 through $(N-1)^{th}$ data level comparator 1310-(N-1) is '0', the level of data included in the received signal may be determined as the first data level $DL_1$.

In order to accurately determine the data level, it is important to properly select the threshold voltages. According to the present invention, the threshold voltages of the sampler 1300 are controlled by the controller 1400.

Specifically, the initial threshold voltages of the sampler 1300 are determined while in the training mode.

As shown in FIG. 12B, the first initial threshold voltage $IV_{TH1}$ through $(N-1)^{th}$ initial threshold voltage $IV_{TH(N-1)}$ of the sampler 1300 determined by the controller 1400 in the training mode are threshold voltages used when the training mode is completed and the actual data is received thereafter. The initial threshold voltage of the sampler 1300 may be updated by the controller 1400, and the method of selecting the first initial threshold voltage $IV_{TH1}$ through the $(N-1)^{th}$ initial threshold voltage $IV_{TH(N-1)}$ by the controller 1400 will be described later.

The controller 1400 generates the HF amplification gain control signal $EQ\_AC_{CTRL}$ and the LF amplification gain control signal $EQ\_DC_{CTRL}$ which control the HF amplification gain and LF amplification gain of the CTLE 1100 according to the target equalization degree of the signal $CTLE_{OUT}$.

In addition, the controller 1400 generates the tap coefficient control signal $TC_{CTRL}$ for adjusting the tap coefficient of the DFE 1200 according to the equalization degree of the signal $DFE_{OUT}$ inputted into the controller 1400.

In addition, the controller 1400 generates the threshold voltage control signal $VTH_{CRTR}$ for controlling the sampling parameter of the sampler 1300 according to the degree of equalization of the signal $DFE_{OUT}$ inputted thereto.

In addition, the controller 1400 generates updated data level upper limit $UDLV_{NH}$ and updated data level lower limit $UDLV_{NL}$ according to the signals $CMP1_{OUT}$ and $CMP2_{OUT}$ outputted by the comparators 1410a and 1410b, respectively.

Hereinafter, the controller 1400 will be described in detail with reference to FIG. 9.

Figure 9A:
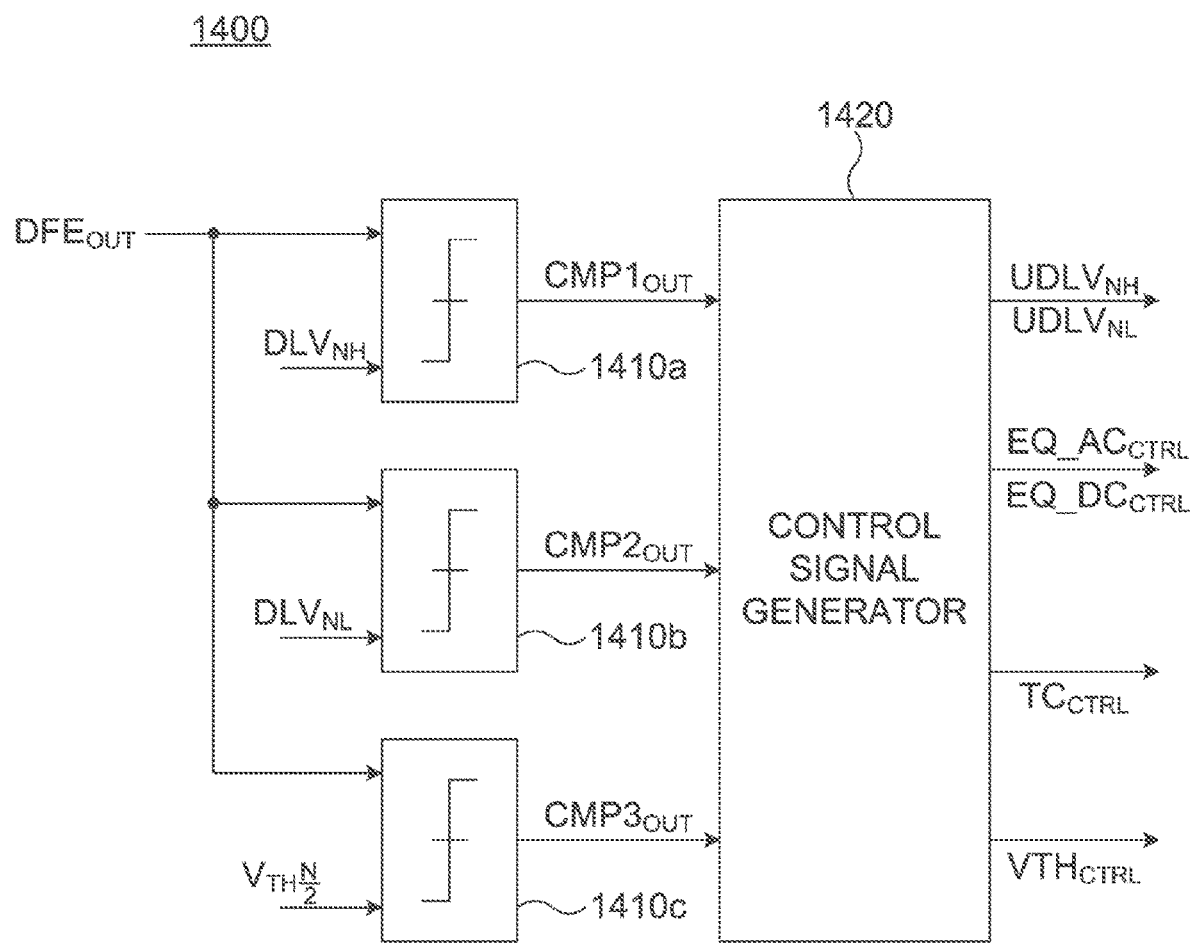
FIGS. 9A and 9B are block diagrams illustrating a controller shown in FIG. 8 in detail.
Figure 9B:
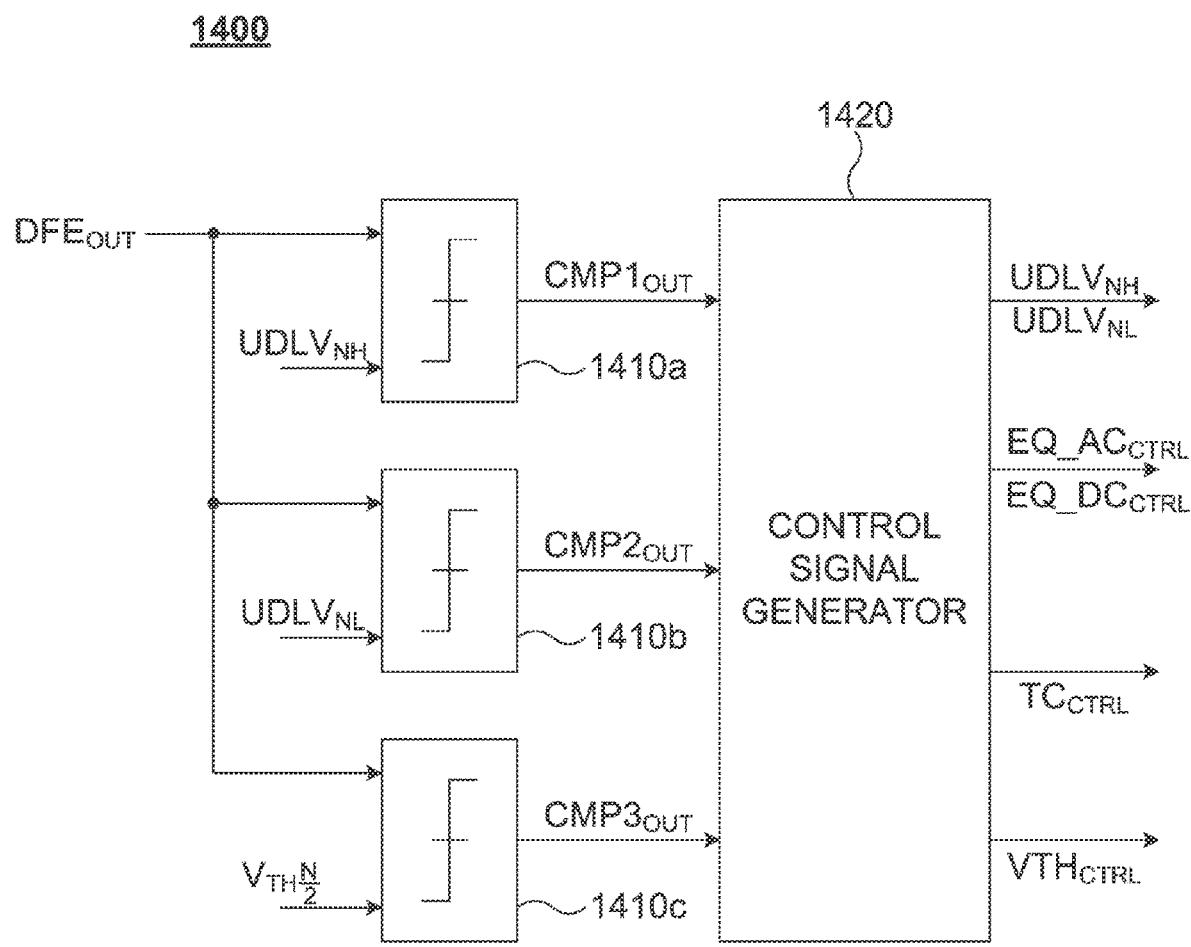

FIGS. 9A and 9B are block diagrams illustrating the controller 1400 shown in FIG. 8 in detail.

Referring to FIG. 9A, the controller 1400 includes a comparator 1410a, a comparator 1410b, a comparator 1410c and a control signal generator 1420.

The comparator 1410a compares the level of the signal $DFE_{OUT}$ with the above-described data level upper limit $DLV_{NH}$ and then outputs a signal $CMP1_{OUT}$ that indicates which one of the signal $DFE_{OUT}$ and the data level upper limit $DLK_{NH}$ is greater. Specifically, when the level of signal $DFE_{OUT}$ is greater than the data level upper limit $DLV_{NH}$, $CMP1_{OUT}=1$ is outputted, and when the level of signal $DFE_{OUT}$ is smaller than the data level upper limit $DLV_{NH}$, $CMP1_{OUT}=0$ is outputted. The updated data level upper limit $UDLV_{NH}$ will be described later.

The comparator 1410b compares the level of the signal $DFE_{OUT}$ with the above-described data level lower limit $DLV_{NL}$ and then outputs a signal $CMP2_{OUT}$ that indicates which one of the signal $DFE_{OUT}$ and the data level lower limit $DLV_{NH}$ is greater. Specifically, when the level of signal $DFE_{OUT}$ is greater than the data level lower limit $DLV_{NL}$, $CMP2_{OUT}=1$ is outputted, and when the level of signal $DFE_{OUT}$ is smaller than the data level lower limit $DLV_{NL}$, $CMP2_{OUT}=0$ is outputted. The updated data level lower limit $UDLV_{NL}$ will be described later.

The coparator 1410c copares the level of the signal $DFE_{OUT}$ with a threshold voltage $$V_{TH\frac{N}{2}}$$

and then outputs a signal $CMP3_{OUT}$ that indicates which one of the signal $DFE_{OUT}$ and the threshold voltage $$V_{TH\frac{N}{2}}$$

is greater. That is, the comparator 1410c determines whether the data included in the received training data pattern is data '00 . . . 00' or data '11 . . . 11'. Specifically, when the level of signal $DFE_{OUT}$ is greater than the threshold voltage $$V_{TH\frac{N}{2}},$$

$CMP3_{OUT}=1$ is outputted, and when the level of signal $DFE_{OUT}$ is smaller than the threshold voltage $$V_{TH\frac{N}{2}},$$

$CMP3_{OUT}=0$ is outputted. That is, the control signal generator 1420 determines the data included in the received training data pattern as data '11 . . . 11' when the level of signal $DFE_{OUT}$ is greater than the threshold voltage $$V_{TH\frac{N}{2}},$$

and the control signal generator 1420 determines the data included in the received training data pattern as data '00 . . . 0' when the level of the signal $DFE_{OUT}$ is smaller than the threshold voltage $V_{TH\frac{N}{2}}$.

The control signal generator 1420 generates an updated data level upper limit $UDLV_{NH}$, an updated data level lower limit $UDLV_{NL}$, the HF amplification gain control signal $EQ\_AC_{CTRL}$, the LF amplification gain control signal $EQ\_DC_{CTRL}$, the tap coefficient control signal $TC_{CTRL}$ and the threshold voltage control signal $VTH_{CTRL}$ based on the signals $CMP1_{OUT}$, $CMP2_{OUT}$ and $CMP3_{OUT}$.

Specifically, when $CMP1_{OUT}=1$, that is, when $DFE_{OUT}>DLV_{NH}$, the control signal generator 1420 outputs an updated data level upper limit $UDLV_{NH}$ obtained by increasing the data level upper limit $DLV_{NH}$ by a predetermined value, and when $CMP1_{OUT}=0$, that is, when $DFE_{OUT}<DLV_{NH}$, the control signal generator 1420 outputs an updated data level upper limit UDLVvH obtained by decreasing the data level upper limit $DLK_{NH}$ by a predetermined value.

In addition, the control signal generator 1420 generates an updated data level lower limit $UDLV_{NL}$ from the updated data level upper limit $UDLV_{NH}$ according to Equation 2 below.

$$UDLN_{NL}=UDLN_{NH}-\Delta DLV_N \text{ (where } \Delta DLV_N \geq 0) \quad \text{[Equation 2]}$$

The equation 2 is substantially the same as the equation 1 described above, and since the difference $\Delta DLV_N$ between the updated data level upper limit $UDLV_{NH}$ and the updated data level lower limit $UDLV_{NL}$ is constant, the updated data level lower limit $UDLV_{NL}$ is updated as the updated data level upper limit $UDLV_{NH}$ is updated according to equation 2.

When the updated data level upper limit $UDLV_{NH}$ and the updated data level lower limit $UDLV_{NL}$ are generated, the control signal generator 1420, as shown in FIG. 9B, generates various control signals according to the values of signals $CMP1_{OUT}$ and $CMP2_{OUT}$ indicating the result of comparisons between the level of the signal $DFE_{OUT}$ and the updated data level upper and lower limits $UDLV_{NH}$ and $UDLV_{NL}$, respectively.

Specifically, when $CMP1_{OUT}=1$, that is, when $DFE_{OUT}>UDLV_{NH}$, the control signal generator 1420 outputs the HF amplification gain control signal $EQ\_AC_{CTRL}$ for decreasing the HF amplification gain of the CTLE 1100, and when $CMP1_{OUT}=0$, that is, when $DFE_{OUT}<UDLV_{NH}$, the control signal generator 1420 outputs the HF amplification gain control signal $EQ\_AC_{CTRL}$ for increasing the HF amplification gain of the CTLE 1100. The HF amplification gain of the CTLE 1100 is increased or decreased according to the HF amplification gain control signal $EQ\_AC_{CTRL}$ outputted from the control signal generator 1420.

In addition, when $CMP2_{OUT}=1$, that is, when $DFE_{OUT}>UDLV_{NL}$, the control signal generator 1420 outputs the LF amplification gain control signal $EQ\_DC_{CRTL}$ for decreasing the LF amplification gain of the CTLE 1100, and when $CMP2_{OUT}=0$, that is, when $DFE_{OUT}<UDLV_{NL}$, the control signal generator 1420 outputs the LF amplification gain control signal $EQ\_DC_{CTRL}$ for increasing the LF amplification gain of the CTLE 1100. The LF amplification gain of the CTLE 1100 is increased or decreased according to the LF amplification gain control signal $EQ\_DC_{CTRL}$ outputted from the control signal generator 1420.

In addition, the control signal generator 1420 generates a control signal $VTH_{CTRL}$ for controlling the threshold voltages of the sampler 1300.

Specifically, the control signal generator 1420 calculates first initial data level $IDL_1$ through $N^{th}$ initial data level $IDL_N$ from the updated data level upper limit $UDLV_{NH}$. Here, the "initial data level" may be an initial value of the data level in the received PAM-N signal shown in FIG. 10. For example, when data '111 . . . 111' is transmitted and received, the received signal that contains data '111 . . . 111' must be determined as data '111 . . . 111' by the sampler 1300. The level of the received signal that corresponds data '111 . . . 111' is referred to as the $N^{th}$ data level $DL_N$ shown in FIG. 10. As described above, since the $N^{th}$ data level $DL_N$ is analog value of a certain range rather than digital value due to the characteristics of the transmission line, ISI, etc., the accuracy of the determination may depend on how the PAM-N receiver is tuned. Therefore, for accurate determination, it is necessary to set the threshold voltage of the sampler 1300 appropriately. It is most desirable to set the threshold voltage based on the actual data level of the received signal such that the characteristics of the transmission line, ISI, etc. are reflected to the threshold voltage. Since the threshold voltages are required when the receiver is used in the field after the training of the receiver is terminated, the threshold voltages must be set from the beginning of receiving the actual data. The initial threshold voltages are calculated from initial data levels as described below.

That is, the control signal generator 1420 calculates first initial data level $IDL_1$ through $N^{th}$ initial data level $IDL_N$, and also calculates the initial threshold voltages therefrom.

More specifically, the control signal generator 1420 calculates the $N^{th}$ initial data level $IDL_N$ from the average value of the updated data level upper limit $UDLV_{NH}$ and the updated data level lower limit $UDLV_{NL}$ as shown in equation 3 below.

$$IDL_N = \frac{UDLV_{NH} + UDLV_{NL}}{2} \quad \text{[Equation 3]}$$

Thereafter, the control signal generator 1420 divides the $N^{th}$ initial data level $IDL_N$ into (N−1) equal intervals as shown in equation 4 below to obtain the first initial data level $IDL_1$ through the $(N-1)^{th}$ initial data level $IDL_{(n-1)}$.

$$\begin{aligned}IDL_{(N-1)} &= \frac{N-2}{N-1}IDL_N \\ IDL_{(N-2)} &= \frac{N-3}{N-1}IDL_N \\ &\vdots \\ IDL_2 &= \frac{1}{N-1}IDL_N \\ IDL_1 &= 0\end{aligned} \quad \text{[Equation 4]}$$

Thereafter, the control signal generator 1420 calculates first initial threshold voltage $IV_{TH1}$ through $(N-1)^{th}$ initial threshold voltage $IV_{TH(N-1)}$ of the sampler 1300 from the first initial data level $IDL_1$ to the $N^{th}$ initial data level $IDL_N$.

Specifically, the control signal generator 1420 calculates the first initial threshold voltage $IV_{TH1}$ through the $(N-1)^{th}$ initial threshold voltage $IV_{TH(N-1)}$ as shown in equation 5 below.

$$IV_{THj} = \frac{IDL_j + IDL_{(j+1)}}{2} \quad \text{[Equation 5]}$$

Here, j is a natural number satisfying $1 \leq j \leq (N-1)$.

The calculated first initial threshold voltage $IV_{TH1}$ to $(N-1)^{th}$ initial threshold voltage $IV_{TH(N-1)}$ are transmitted to the sampler 1300 as the threshold voltage control signal $VTH_{CTRL}$.

The comparator 1410a, comparator 1410b and comparator 1410c of the controller 1400 may be embodied separately in the sampler 1300 shown in FIG. 8 or embodied using the comparators included in the sampler 1300. That is, the comparator 1410a, the comparator 1410b and the comparator 1410c of the controller 1400 may be embodied using the comparators included in the PAM-N receiver as needed or may be provided separately.

Hereinafter, a method of training an equalizer system according to the present invention will be described in detail with reference to the accompanying drawings.

Figure 13A:
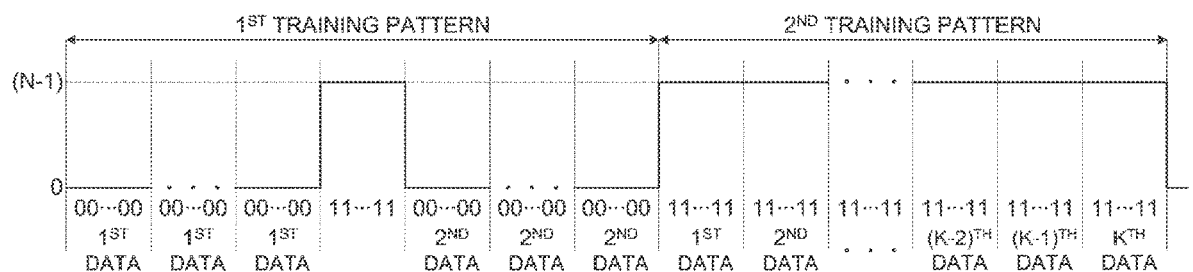
FIGS. 13A and 13B are waveform diagrams illustrating a training data pattern used for training of an equalizer system according to the present invention.
Figure 13B:
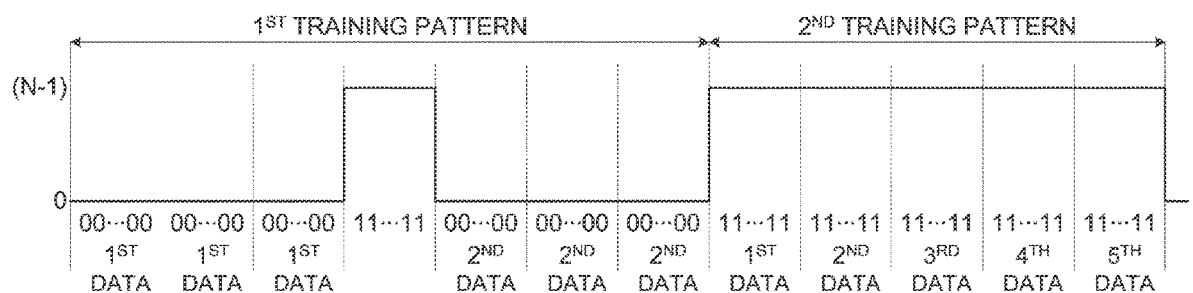

FIGS. 13A and 13B are waveform diagrams illustrating a training data pattern used for training of the equalizer system according to the present invention.

The equalizer system according to the present invention is tuned (trained) and optimized by reflecting the characteristics of the transmission line, ISI, etc. via the training mode before putting to use, and is used in an optimized state when receiving actual data in the field.

In the training mode, the equalizer system according to the present invention receives the training data pattern shown in FIG. 13A which is transmitted by the transmitter (not shown), and the equalizer system is tuned and optimized according to the characteristics of the received training data pattern.

Referring to FIG. 13A, the training data pattern consists of a first training pattern and a second training pattern.

As shown in FIG. 13A, the first training pattern at least includes consecutively arranged first data '00 . . . 00', data '11 . . . 11' and second data '00 . . . 00'. In addition, the first training pattern may further include one or more data '00 . . . 00' consecutively arranged before the first data '00 . . . 00'. In other words, the first training pattern, as a whole, may include one or more data '00 . . . 00' before the first data '00 . . . 00', the first data '00 . . . 00', the data '11 . . . 11', the second data '00 . . . 00' and one or more data '00 . . . 00' after the second data '00 . . . 00'. However, the one or more data '00 . . . 00' before the first data '00 . . . 00' and the one or more data '00 . . . 00' after the second data '00 . . . 00' are not necessary to perform the method of the present invention. Moreover, the first training pattern may only include the one or more data '00 . . . 00' before the first data '00 . . . 00' in addition to the first data '00 . . . 00', the data '11 . . . 11', the second data '00 . . . 00', only include the one or more data '00 . . . 00' after the second data '00 . . . 00' in addition to the first data '00 . . . -00', the data '11 . . . 11', the second data '00 . . . 00', or include both the one or more data '00 . . . 00' before the first data '00 . . . 00' and the one or more data '00 . . . 00' after the second data '00 . . . 00'. Furthermore, the one or more data '00 . . . 00' before the first data '00 . . . 00' and the first data '00 . . . 00' may be collectively referred to as the first data '00 . . . 00', and the second data '00 . . . 00' and the one or more data '00 . . . 00' after the second data '00 . . . 00' may be collectively referred to as the second data '00 . . . 00'. It should be noted that the training data pattern includes only '00 . . . 00' (all zeros) corresponding to decimal zero and '11 . . . 11' (all ones) corresponding to decimal (N−1).

The second training pattern includes consecutively arranged first data '11 . . . 11' through $K^{th}$ data '11 . . . 11' after the second data '00 . . . 00' of the first training pattern (where K is a natural number greater than or equal to 2).

Here, binary number '11 . . . 11' in PAM-N signal is equal to decimal number (N−1). Therefore, data '11 . . . 11' is the maximum value of data that can be transmitted in the PAM-N signal (e.g., '11' in PAM-4 signal). Also, '00 . . . 00' in PAM-N signal is equal to decimal number 0. Therefore, data '00 . . . 00' is the minimum value of data that can be transmitted in PAM-N signal (e.g., '00' in the PAM-4 signal).

FIG. 13B illustrates an example training data pattern of FIG. 13A when K=5.

Specifically, the first training pattern shown in FIG. 13B includes consecutively arranged three counts of first data '00 . . . 00', one count of data '11 . . . 11' and consecutively arranged three counts of second data '00 . . . 00'. That is, the first training pattern shown in FIG. 13B includes three counts of data '00 . . . 00' both before and after data '11 . . . 11'.

The second training pattern shown in FIG. 13B includes consecutively arranged first data '11 . . . 11' through fifth data '11 . . . 11' after the third second data '00 . . . 00' of the first training pattern. That is, the second training pattern shown in FIG. 13B exemplifies a case when K=5 in the second training pattern shown in FIG. 13A.

The training data pattern shown in FIG. 13B includes three counts of data '00 . . . 00' both before and after data '11 . . . 11'. This configuration is to deal with a dispersion phenomenon which occurs when actual data is received. Specifically, when a signal including multiple frequency components passes through a transmission cable, the signal is dispersed with respect to time and values of neighboring data are attenuated due to the difference in time necessary for the signal having multiple frequency components to pass therethrough depending on the frequency. This is referred to as the dispersion phenomenon. The equalizer system is required to overcome this attenuation and equalize the data. Therefore, in the training data pattern shown in FIG. 13B, three counts of data '00 . . . 00' are arranged both before and after data '11 . . . 11' in order to deliberately cause a large dispersion phenomenon, and when the equalizer system is trained with such training data pattern, the equalizer system is then capable of dealing with the dispersion phenomenon which occurs when the receiver is put to use and actual data other than the training data is received.

In addition, in order to maintain DC balance, the training data pattern shown in FIG. 13B includes six counts of '11 . . . 11' and six counts of '00 . . . 00' in total.

However, the training data pattern used in the method according to the present invention is not limited to the waveform shown in FIG. 13B. For example, the first training pattern may include two counts of data '00 . . . 00' before and two counts of data '00 . . . 00' after data '11 . . . 11', and the second training pattern may include two or more counts of data '11 . . . 11'.

Hereinafter, a method of training the equalizer system according to the present invention using the training data pattern shown FIGS. 13A and 13B will be described in detail with reference to FIGS. 14 through 19.

Figure 14:
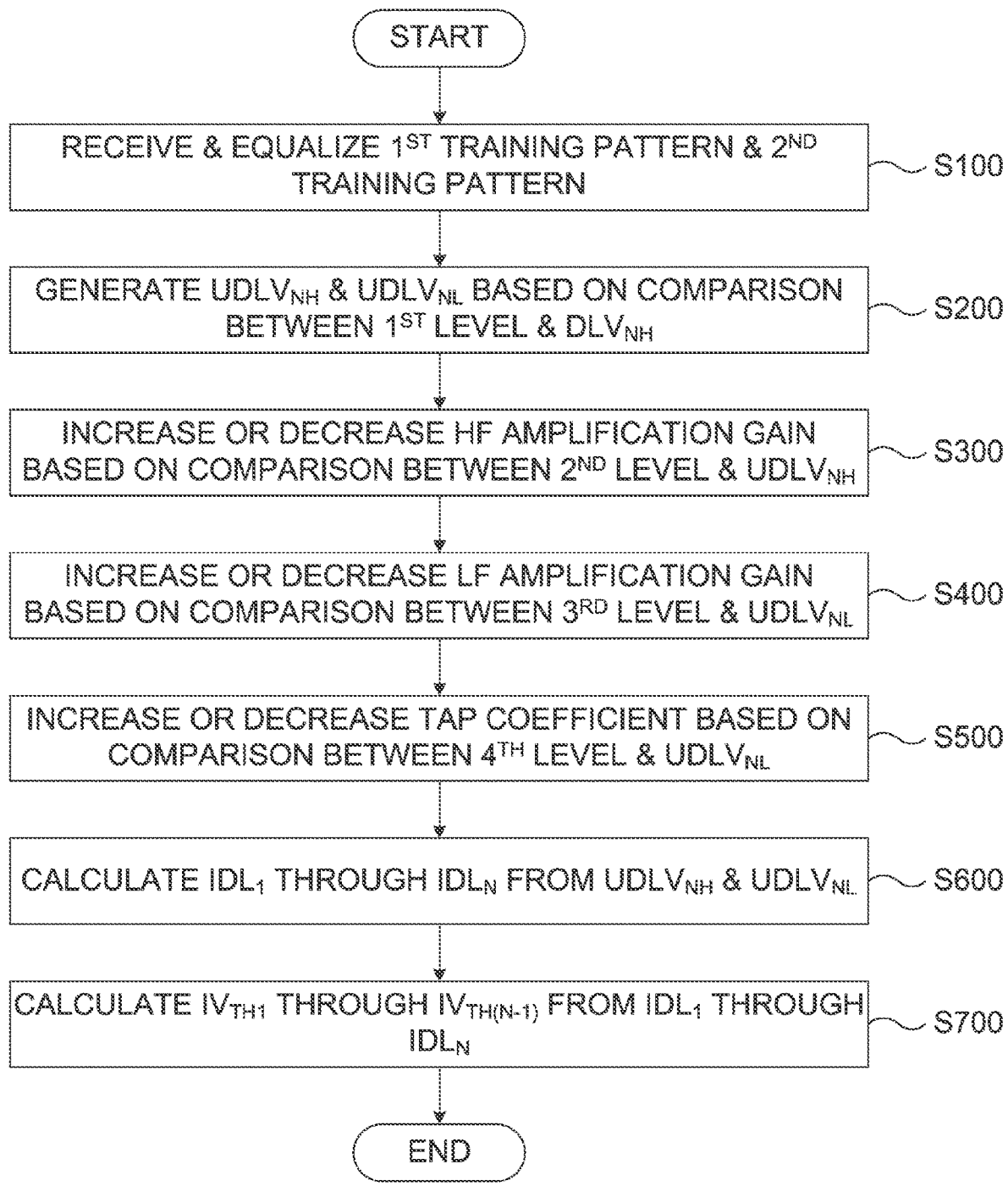
FIG. 14 is a flowchart showing a method of training an equalizer system according to the present invention.

FIG. 14 is a flowchart illustrating a method of training an equalizer system according to the present invention.

Referring to FIG. 14, the equalizer system according to the present invention receives the training data pattern including the first training pattern and the second training pattern shown in FIG. 13A transmitted from the transmitter (not shown) (S100).

Thereafter, the equalizer system according to the present invention generates the updated data level upper limit $UDLV_{NH}$ and the updated data level lower limit $UDLV_{NL}$ from the updated data level upper limit $UDLV_{NH}$ based on the equation 2 above by increasing or decreasing the data level upper limit $DLV_{NH}$ according to which one of the level of the output signal $DFE_{OUT}$ and the data level upper limit $DLV_{NH}$ is greater (S200). Here, the level of the output signal $DFE_{OUT}$ refers to the level of the signal outputted from the decision feedback equalizer obtained by receiving and equalizing the data '11 . . . 11', i.e. the level of the output signal corresponding to the data '11 . . . 11' of the first training pattern.

In order to perform step S200, the equalizer system must be able to distinguish the received data '11 . . . 11' from the received data '00 . . . 00'. That is, since the training data pattern only includes the data '00 . . . 00' and the data '11 . . . 11', it is sufficient if the data '11 . . . 11' can be distinguished from the data '00 . . . 00'. Moreover, the output signal $DFE_{OUT}$ is an analog signal even though the transmitted data is digital. For example, the output signal $DFE_{OUT}$ obtained by receiving and equalizing the data '11 . . . 11' is an analog signal with a data level (voltage) varying around the data level (voltage) of the digital data '11 . . . 11' transmitted by transmitter. As described above, this phenomenon occurs due to the characteristics of the transmission line and the receiver itself.

Since the training data pattern is known, the value of received data is either '00 . . . 00' or '11 . . . 11'. That is, the received data may be determined as either data '00 . . . 00' or data '11 . . . 11'. This may be achieved by checking the output of the comparator 1410c shown in FIG. 9A. For example, when the comparator 1410c compares the level of the output signal $DFE_{OUT}$ with the threshold voltage $$V_{TH\frac{N}{2}},$$

and outputs $CMP3_{OUT}=1$ (i.e., $$DFE_{OUT} > V_{TH\frac{N}{2}}\Big),$$

this indicates that the data '11 . . . 11' of the first training pattern is received. Similarly, when the comparator 1410c compares the level of the output signal $DFE_{OUT}$ with the threshold voltage $$V_{TH\frac{N}{2}},$$

and outputs $CMP3_{OUT}=0$ (i.e., $$DFE_{OUT} < V_{TH\frac{N}{2}}\Big),$$

this indicates that the data '00 . . . 00' of the first training pattern is received. Accordingly, when $CMP3_{OUT}=1$, the output signal $DFE_{OUT}$ corresponds to the data '11 . . . 11' of the first training pattern, and when $CMP3_{OUT}=0$, the output signal $DFE_{OUT}$ corresponds to the data '00 . . . 00' of the first training pattern.

Once the output signal $DFE_{OUT}$ is determined to be data '11 . . . 11' from the first training pattern by the comparator 1410c (i.e., $CMP3_{OUT}=1$), step S200 may be performed.

Specifically, the level (referred to as "first level" hereinafter) of the output signal $DFE_{OUT}$ corresponding to the data '11 . . . 11' of the first training pattern is compared with the data level upper limit $DLV_{NH}$ to determine which one of the first level and the data level upper limit $DLV_{NH}$ is greater.

Hereinafter, step S200 will be described in detail with reference to FIGS. 15A through 15C.

Figure 15A:
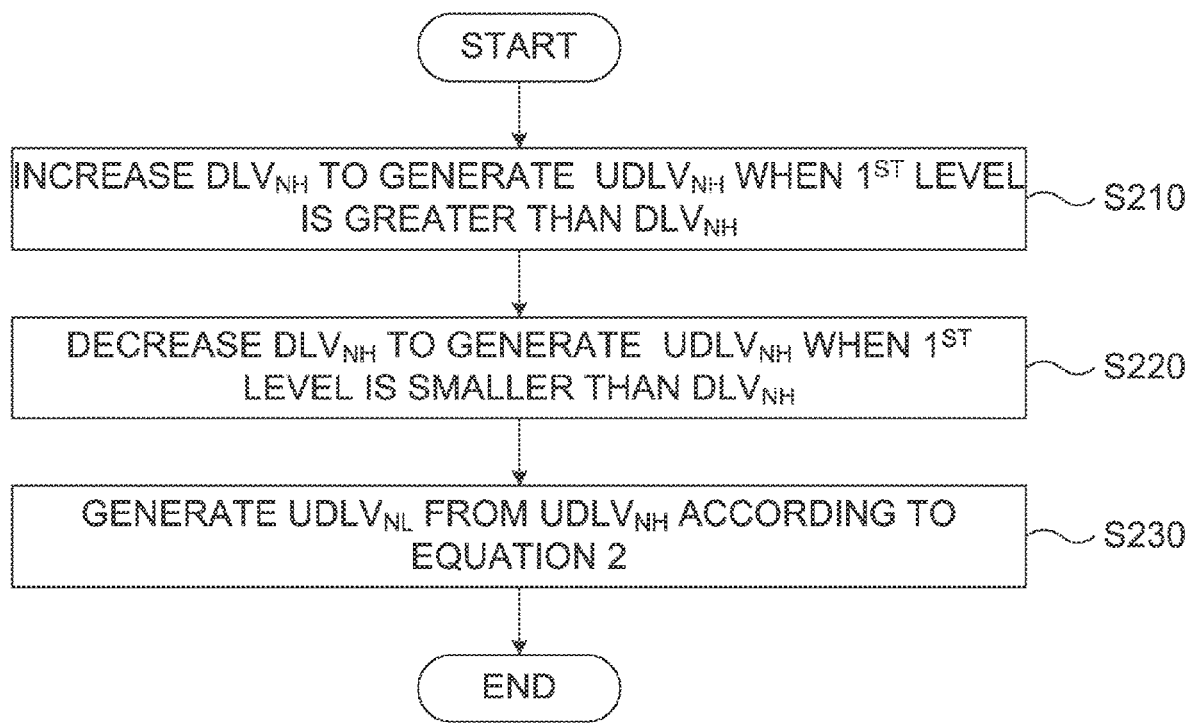
FIG. 15A is a flowchart illustrating step S200 shown in FIG. 14 in detail.
Figure 15B:
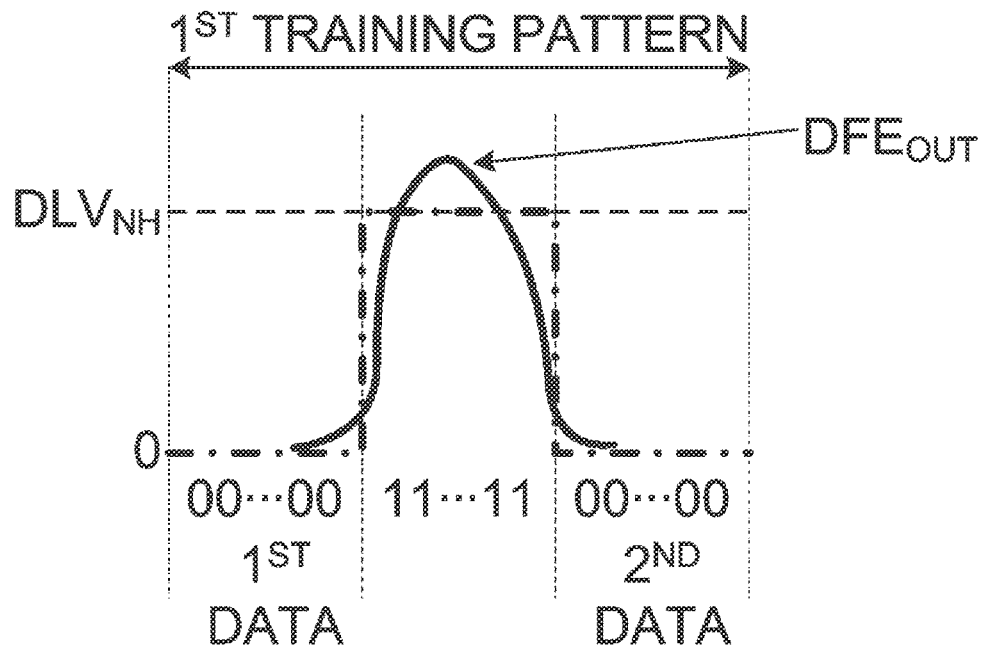
FIGS. 15B and 15C are waveform diagrams illustrating examples where $DFE_{OUT}>DLV_{NH}$ and $DFE_{OUT}<DLV_{NH}$, respectively.
Figure 15C:
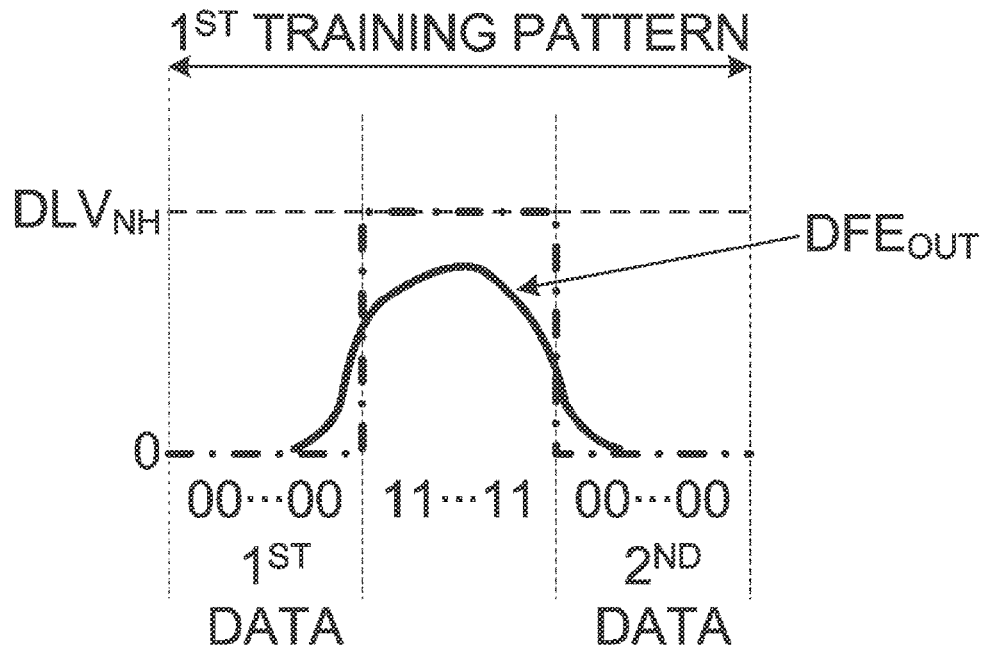

FIG. 15A is a flowchart illustrating step S200 in detail, and FIGS. 15B and 15C are waveform diagrams exemplifying when $DFE_{OUT}>DLV_{NH}$ and $DFE_{OUT}<DLV_{NH}$, respectively.

Referring to FIG. 15A, when the first level is greater than the data level upper limit $DLV_{NH}$ (i.e. $CMP1_{OUT}=1$), the control signal generator 1420 of FIG. 9A increases the data level upper limit $DLV_{NH}$ to generate updated data level upper limit $UDLV_{NH}$ (S210).

For example, when $DFE_{OUT}>DLV_{NH}$ (where $DFE_{OUT}$ is indicated by a solid line and transmitted data is indicated by a dashed-dotted line) as shown in FIG. 15B, the data level upper limit $DLV_{NH}$ is increased by a predetermined amount to generate updated data level upper limit $UDLV_{NH}$ (i.e. $UDLV_{NH}>DLV_{NH}$).

When the first level is smaller than the data level upper limit $DLV_{NH}$ (i.e. $CMP1_{OUT}=0$), the control signal generator 1420 of FIG. 9A decreases the data level upper limit $DLV_{NH}$ to generate updated data level upper limit $UDLV_{NH}$ (S220).

For example, when $DFE_{OUT}<DLV_{NH}$ (where $DFE_{OUT}$ is indicated by a solid line and transmitted data is indicated by a dashed-dotted line) as shown in FIG. 15C, the data level upper limit $DLV_{NH}$ is decreased by a predetermined amount to generate updated data level upper limit $UDLV_{NH}$ (i.e. $UDLV_{NH}<DLV_{NH}$).

Thereafter, as described with reference to the equation 2, the updated data level lower limit $UDLV_{NL}$ is generated from the updated data level upper limit $UDLV_{NH}$ (S230).

By performing step S200, the updating process of the data level upper limit $DLV_{NH}$ and the data level lower limit $DLV_{NL}$ using the first training pattern is completed.

Referring back to FIG. 14, the HF amplification gain of the linear equalizer is increased or decreased based on the result of comparison between: the level of the output signal $DFE_{OUT}$ of the decision feedback equalizer corresponding to the first data '11 . . . 11' of the second training pattern: and the updated data level upper limit $UDLV_{NH}$ when the transition from the second data '00 . . . 00' of the first training pattern to the first data '11 . . . 11' of the second training pattern occurs (S300).

The transition from the second data '00 . . . 00' of the first training pattern to the first data '11 . . . 11' of the second training pattern may be recognized by checking the output of the comparator 1410c shown in FIG. 9A similar to step S200. For example, the output of the comparator 1410c should change from $CMP3_{OUT}=0$ to $CMP3_{OUT}=1$ when the transition from the second data '00 . . . 00' of the first training pattern to the first data '11 . . . 11' of the second training pattern occurs. That is, the comparator 1410c compares the output signal $DFE_{OUT}$ with threshold voltage $$\left(V_{TH\frac{N}{2}},\right)$$

and when the outputs thereof changes from $CMP3_{OUT}=0$ (i.e.

$$DFE_{OUT} < V_{TH\frac{N}{2}}\Big)$$

to $CMP3_{OUT}=1$ (i.e., $$DFE_{OUT} > V_{TH\frac{N}{2}}),$$

this indicates that the transition from the second data '00 . . . 00' of the first training pattern to the first data '11 . . . 11' of the second training pattern has occurred.

Once the transition occurs, step S300 may be performed. Specifically, the level (referred to as "second level" hereinafter) of the output signal $DFE_{OUT}$ corresponding to the first data '11 . . . 11' of the second training pattern is compared with the updated data level upper limit $UDLV_{NH}$ to determine which one of the second level and the updated data level upper limit $UDLV_{NH}$ is greater when the output of the comparator 1410c changes from $CMP3_{OUT}=0$ to $CMP3_{OUT}=1$.

Hereinafter, step S300 will be described in detail with reference to FIGS. 16A through 16C.

Figure 16A:
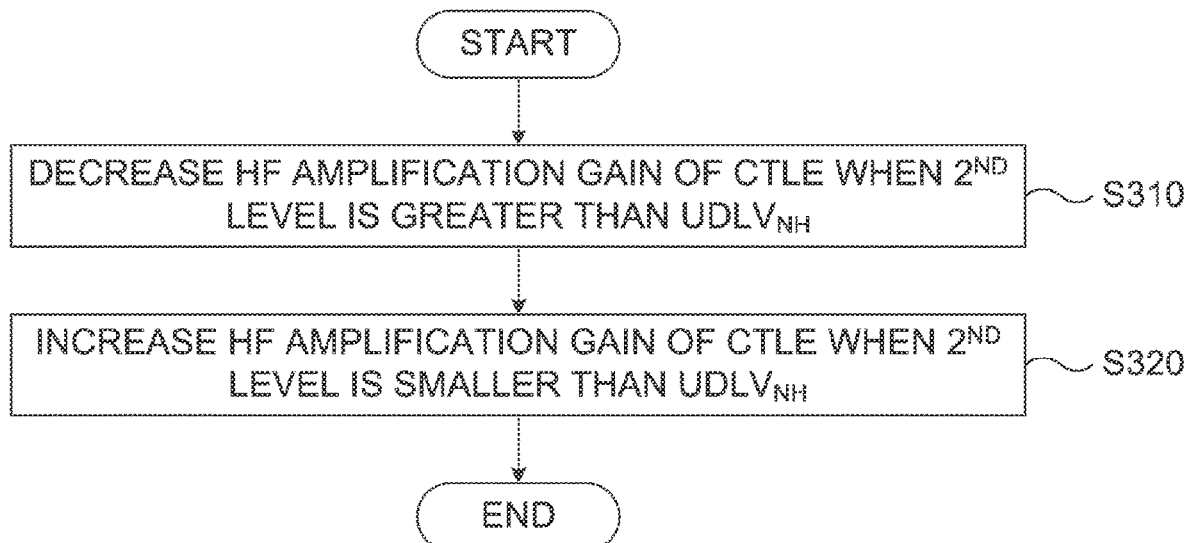
FIG. 16A is a flowchart illustrating step S300 shown in FIG. 14 in detail.
Figure 16B:
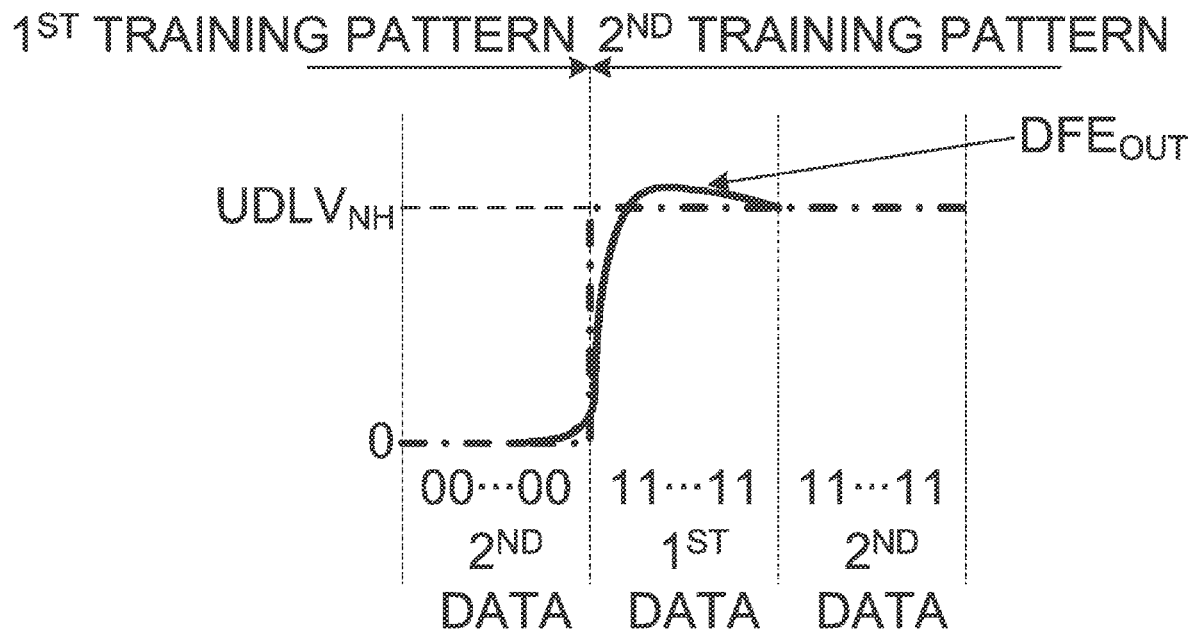
FIGS. 16B and 16C are waveform diagrams illustrating examples where $DFE_{OUT}>UDLV_{NH}$ and $DTE_{OUT}<UDLV_{NH}$, respectively.
Figure 16C:
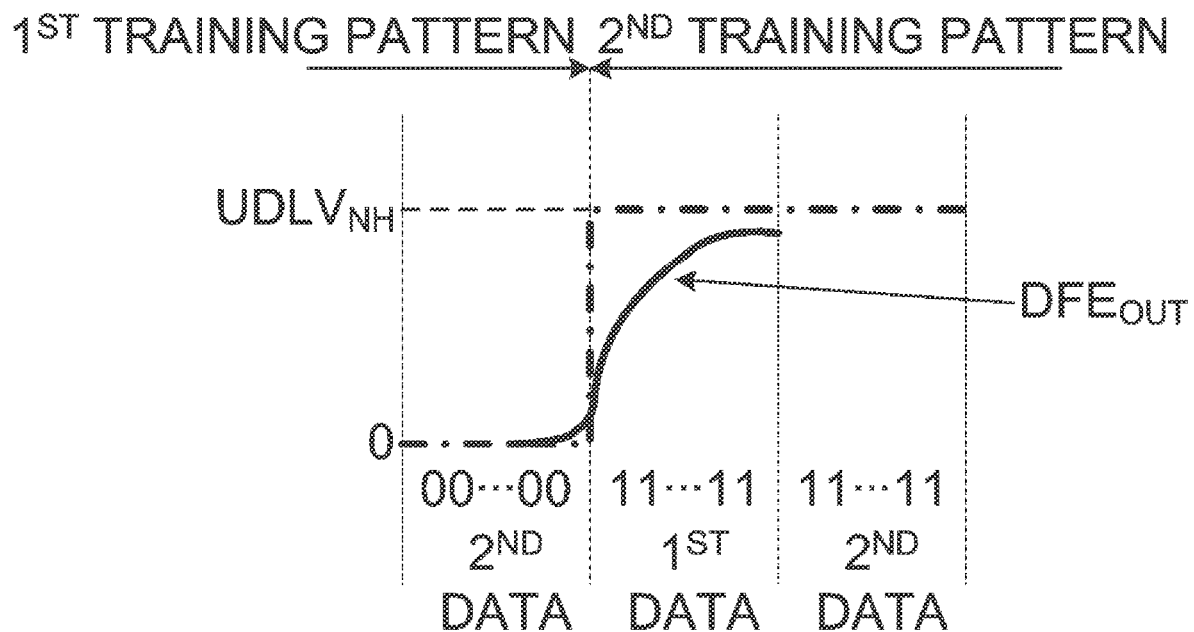

FIG. 16A is a flowchart illustrating step S300 in detail, and FIGS. 16B and 16C are waveform diagrams exemplifying when $DFE_{OUT}>UDL_{NH}$ and $DFE_{OUT}<UDLV_{NH}$, respectively.

Referring to FIG. 16A, when the second level is greater than the updated data level upper limit $UDLV_{NH}$ generated in step S200 (i.e. $CMP1_{OUT}=1$) as the transition from the second data '00 . . . 00' of the first training pattern to the first data '11 . . . 11' of the second training pattern occurs, the control signal generator 1420 of FIG. 9A decreases the HF amplification gain (S310).

For example, as shown in FIG. 16B, when $DFE_{OUT}>UDLV_{NH}$ (where $DFE_{OUT}$ is indicated by a solid line and transmitted data is indicated by a dashed-dotted line), the HF amplification gain of CTLE 1100 should be decreased since "$DFE_{OUT}>UDLV_{NH}$" means that the high-frequency component of the output signal $DFE_{OUT}$ is excessively amplified. Therefore, the controller 1400 issues a signal $EQ\_AC_{CTRL}$ for decreasing the HF amplification gain of the CTLE 1100, and the HF amplification gain of the CTLE 1100 that has received the signal $EQ\_AC_{CTRL}$ is decreased accordingly.

When the second level is smaller than the updated data level upper limit $UDLV_{NH}$ generated in step S200 (i.e. $CMP1_{OUT}=0$) as the transition from the second data '00 . . . 00' of the first training pattern to the first data '11 . . . 11' of the second training pattern occurs, the control signal generator 1420 of FIG. 9A increases the HF amplification gain (S320).

For example, as shown in FIG. 16C, when $DFE_{OUT}<UDLV_{NH}$ (where $DFE_{OUT}$ is indicated by a solid line and transmitted data is indicated by a dashed-dotted line), the HF amplification gain of CTLE 1100 should be increased since "$DFE_{OUT}<UDLV_{NH}$" means that the high-frequency component of the output signal $DFE_{OUT}$ is not sufficiently amplified. Therefore, the controller 1400 issues a signal $EQ\_AC_{CTRL}$ for increasing the HF amplification gain of the CTLE 1100, and the HF amplification gain of the CTLE 1100 that has received the signal $EQ\_AC_{CTRL}$ is increased accordingly.

Referring back to FIG. 14, the LF amplification gain of the linear equalizer is increased or decreased based on the result of comparison between: the level of the output signal $DFE_{OUT}$ of the decision feedback equalizer corresponding to the second data '11 . . . 11' through $K^{th}$ data '11 . . . 11' of the second training pattern (collectively referred to as "third level" hereinafter); and the updated data level lower limit $UDLV_L$ (S400).

Hereinafter, step S400 will be described in detail with reference to FIGS. 17A through 17C.

Figure 17A:
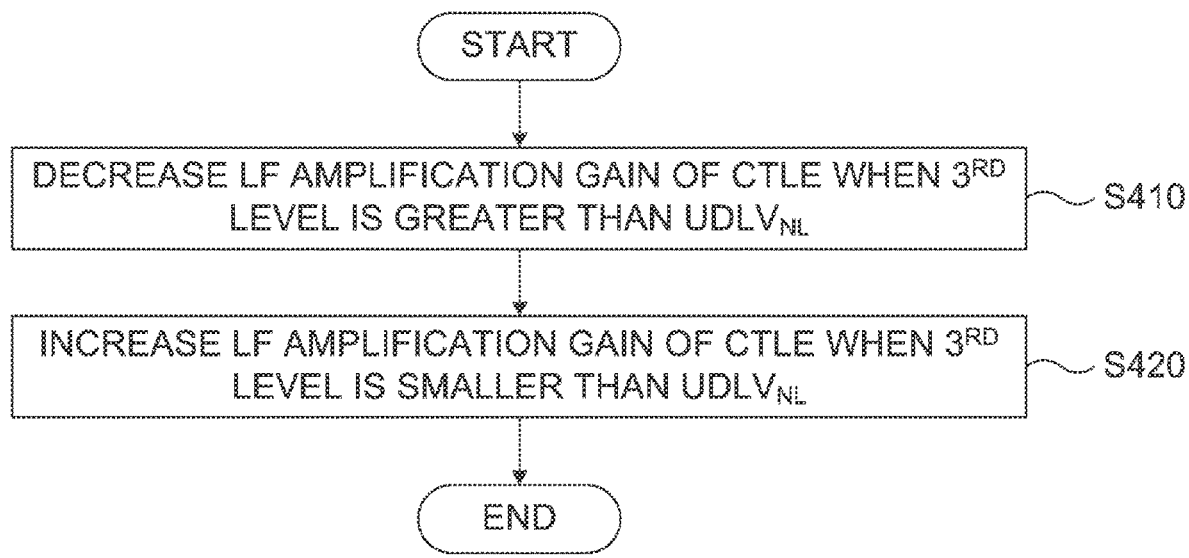
FIG. 17A is a flowchart illustrating step S400 shown in FIG. 14 in detail.
Figure 17B:
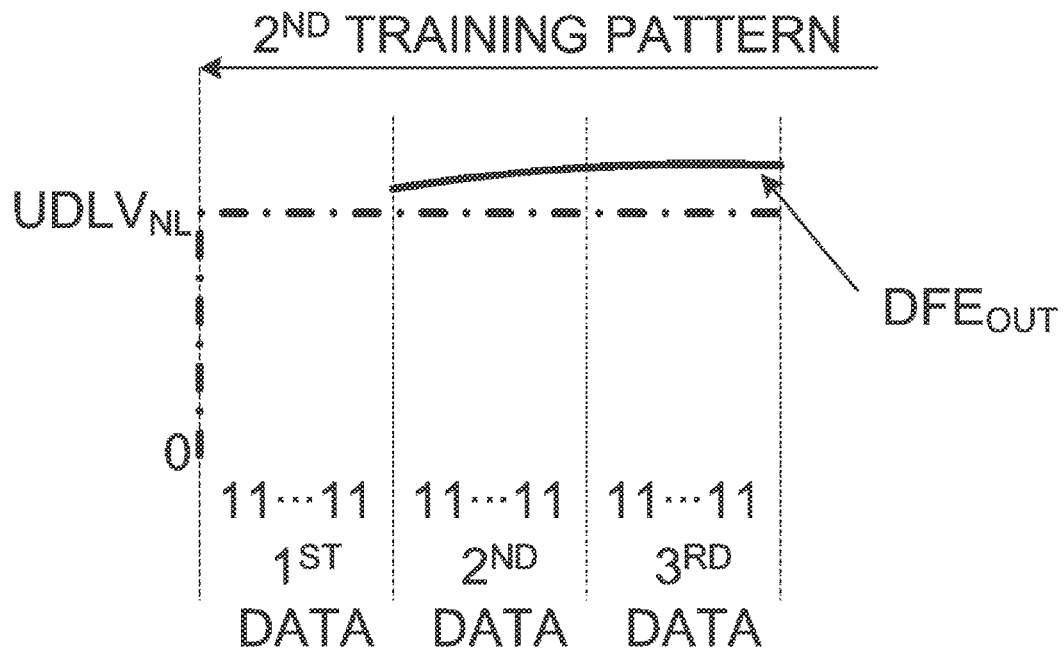
FIGS. 17B and 17C are waveform diagrams illustrating examples where $DFE_{OUT}>UDLV_{NH}$ and $DFE_{OUT}<UDLV_{NH}$, respectively.
Figure 17C:
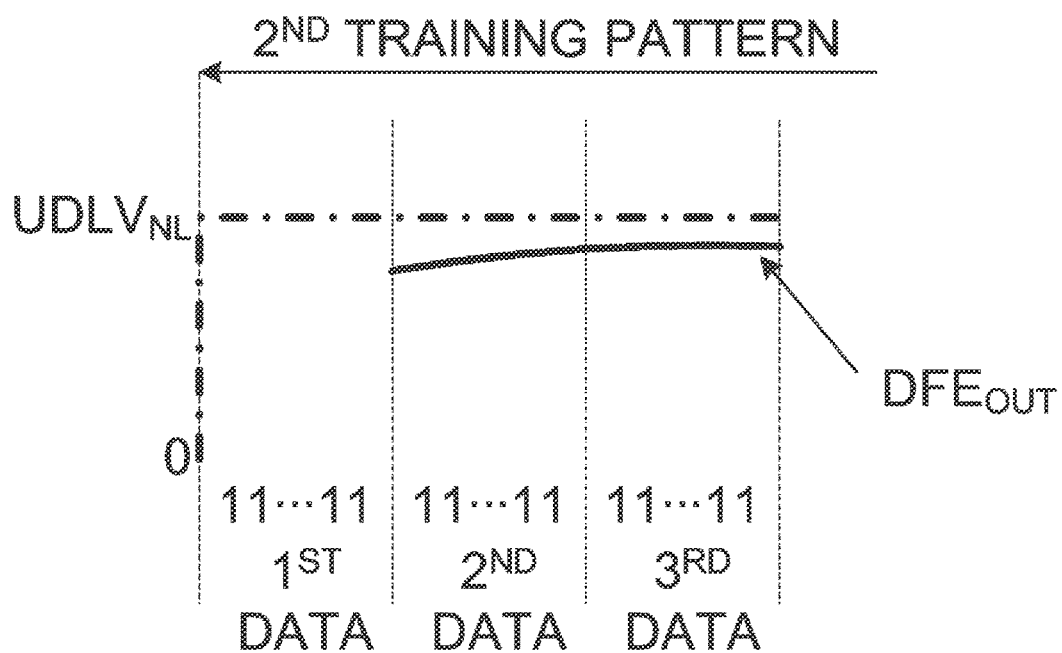

FIG. 17A is a flowchart illustrating step S400 in detail, and FIGS. 17B and 17C are waveform diagrams exemplifying when $DFE_{OUT}>UDL_{NL}$ and $DFE_{OUT}<UDLV_{NL}$, are satisfied, respectively.

Referring to FIG. 17A, when the third level is greater than the updated data level lower limit $UDLV_{NL}$ (i.e. $CMP2_{OUT}=1$), the control signal generator 1420 of FIG. 9A decreases the LF amplification gain (S410).

For example, as shown in FIG. 17B, when $DFE_{OUT}>UDLV_{NL}$ (where $DFE_{OUT}$ is indicated by a solid line and transmitted data is indicated by a dashed-dotted line), the LF amplification gain of CTLE 1100 should be decreased since "$DFE_{OUT}>UDLV_{NL}$" means that the low-frequency component of the output signal $DFE_{OUT}$ is excessively amplified. Therefore, the controller 1400 issues a signal $EQ\_DC_{CTRL}$ for decreasing the LF amplification gain of the CTLE 1100, and the LF amplification gain of the CTLE 1100 that has received the signal $EQ\_DC_{CTRL}$ is decreased accordingly.

When the third level is smaller than the updated data level lower limit $UDLV_{NL}$ (i.e. $CMP2_{OUT}=-0$), the control signal generator 1420 of FIG. 9A increases the LF amplification gain (S420).

For example, as shown in FIG. 17C, when $DFE_{OUT}<UDLV_{NL}$ (where $DFE_{OUT}$ is indicated by a solid line and transmitted data is indicated by a dashed-dotted line), the LF amplification gain of CTLE 1100 should be increased since "$DFE_{OUT}<UDLV_{NL}$" means that the low-frequency component of the output signal $DFE_{OUT}$ is not sufficiently amplified. Therefore, the controller 1400 issues a signal $EQ\_DC_{CTRL}$ for increasing the LF amplification gain of the CTLE 1100, and the LF amplification gain of the CTLE 1100 that has received the signal $EQ\_DC_{CTRL}$ is increased accordingly.

Referring back to FIG. 14, the tap coefficient of the decision feedback equalizer is increased or decreased based on the result of comparison between: the level (referred to as "fourth level" hereinafter) of the output signal $DFF_{OUT}$ of the decision feedback equalizer corresponding to one or more data selected from the first data '11 . . . 11' through $K^{th}$ data '11 . . . 11' of the second training pattern; and the updated data level lower limit $UDLV_{NL}$ (S500).

Hereinafter, step S500 will be described in detail with reference to FIGS. 18A through 18E.

Figure 18A:
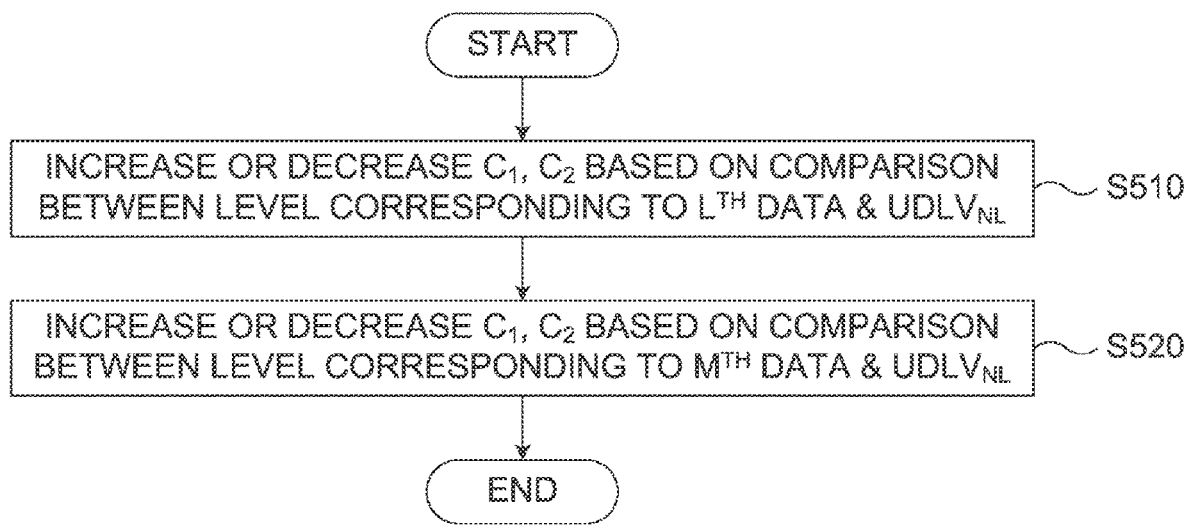
FIG. 18A is a flowchart illustrating step S500 shown in FIG. 14 in detail.

FIG. 18A is a flowchart illustrating step S500 in detail, and FIGS. 18B through 18E are waveform diagrams that comparatively illustrate levels of various output signals $DFE_{OUT}$ and the updated data level lower limits $UDLV_{NL}$, respectively.

In order to facilitate description, it is assumed that the one or more data '11 . . . 11' selected from the first data '11 . . . 11' through $K^{th}$ data '11 . . . 11' of the second training pattern in the step S500 are two consecutive data '11 . . . 11' (referred to as $L^{th}$ data '11 . . . 11' and $M^{th}$ data '11 . . . 11' respectively) as shown in FIGS. 18B through 18E, where L≠M and L and M are natural numbers satisfying 1≤L≤K and 1≤M≤K, respectively).

It is also assumed that data '00 . . . 00' and data '11 . . . 11' are received (or transmitted) before the $L^{th}$ data '11 . . . 11'. However, the one or more data '11 . . . 11' is not limited to two data '11 . . . 11', and one or more data '11 . . . 11' may be one data '11 . . . 11' or three or more data '11 . . . 11'. In addition, it is not necessary that data '00 . . . 00' and data '11 . . . 11' are received (or transmitted) before the one or more data '11 . . . 11'.

In addition, while a method of adjusting the tap coefficient of a 2-tap decision feedback equalizer is described in the following, the decision feedback equalizer is not limited to a 2-tap decision feedback equalizer, and the present invention may also be applied to a 1-tap or 3-tap or more decision feedback equalizer.

Referring to FIG. 18A, the coefficients $C_1$ and $C_2$ of the 2-tap decision feedback equalizer are increased or decreased, respectively, based on the result of comparison between: the level of the output signal $DFE_{OUT}$ of the decision feedback equalizer corresponding to the $L^{th}$ data '11 . . . 11'; and the updated data level lower limit $UDLV_{NL}$ (S510).

The coefficients $C_1$ and $C_2$ of the 2-tap decision feedback equalizer are increased or decreased, respectively, also based on the result of comparison between: the level of the output signal $DFE_{OUT}$ of the decision feedback equalizer corresponding to the $M^{th}$ data '11 . . . 11'; and the updated data level lower limit $UDLV_{NL}$ (S520).

FIGS. 18B through 18E exemplify the data level lower limits $DLV_{NL}$ and also the output signals $DFE_{OUT}$ with different magnitudes (levels). Detailed descriptions will be given below for examples shown in FIGS. 18B through 18E.

Figure 7B:
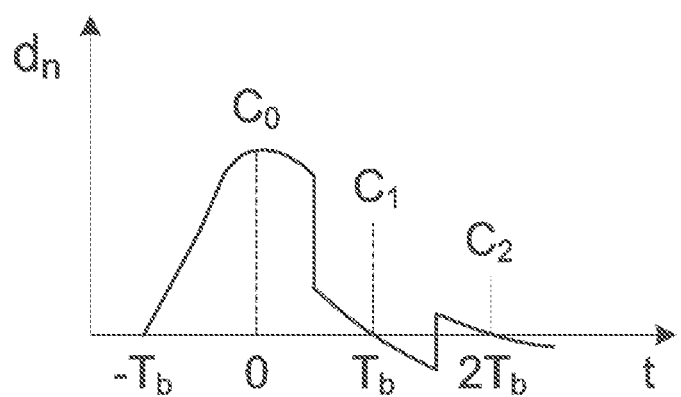
FIG. 7B is a waveform diagram illustrating a signal $d_n$ with post-cursors thereof partially removed.
Figure 18B:
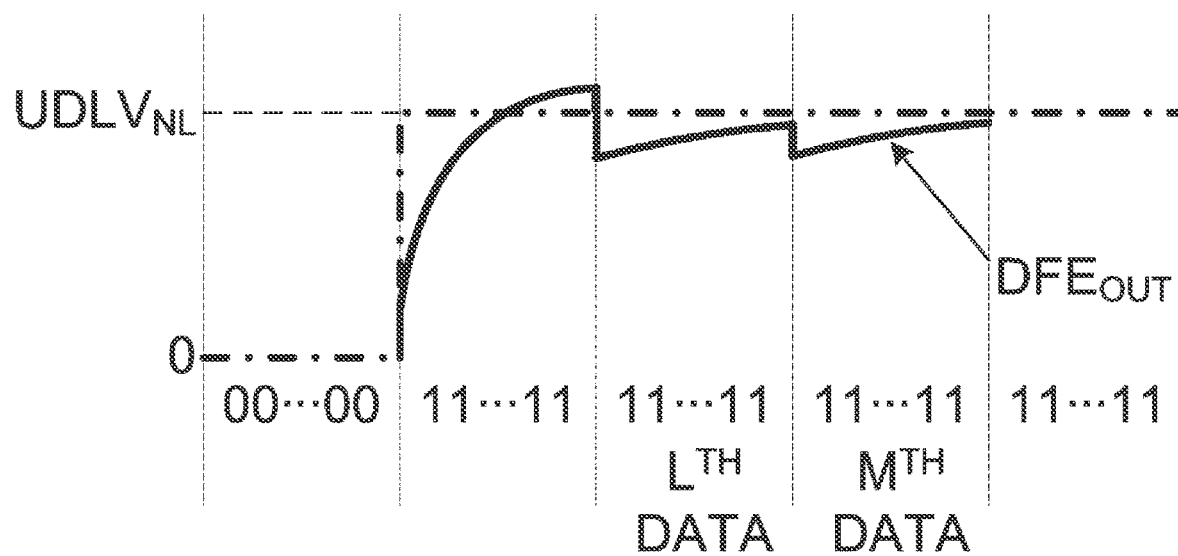
FIGS. 18B through 18E are waveform diagrams comparatively illustrating levels of various output signals $DFE_{OUT}$ and updated data level lower limits $UDLV_{NH}$, respectively.

FIG. 18B illustrates an example wherein the output signals $DFE_{OUT}$ corresponding to the $L^{th}$ data and the $M^{th}$ data are smaller than the updated data level lower limits $UDLV_{NL}$. As shown in FIG. 18B, the level of the output signal $DFE_{OUT}$ corresponding to the $L^{th}$ data '11 . . . 11' is smaller than the updated data level lower limit $UDLV_{NL}$. Since the data one clock prior to the $L^{th}$ data '11 . . . 11' is '11 . . . 11', it can be interpreted that the signal $CTLE_{OUT}$ is over-compensated such that the post-cursor in the signal $CTLE_{OUT}$ is excessively removed due to excessively large tap coefficient $C_1$. Moreover, since the data two clocks prior to the $L^{th}$ data '11 . . . 11' is '00 . . . 00', it can be interpreted that the signal $CTLE_{OUT}$ is under-compensated such that the level of the signal $CTLE_{OUT}$ is insufficiently increased by the DFE 1200 due to excessively small tap coefficient $C_2$. It should be noted that the signals that is fed-back in the decision feedback equalizer such as $ds_{n-1}$ and $ds_{n-2}$ represent the signs of the signal processed by a slicer as described with reference to FIGS. 7A and 7B. That is, when the data one clock or two clocks prior to the $L^{th}$ data '11 . . . 11' is '00 . . . 00', both $ds_{n-1}$ and $ds_{n-2}$ have a value of ' . . . 1' such that the level of the signal $CTLE_{OUT}$ is increased by the negative feedback. For example, $C_1 \times ds_{n-1}$ is a negative number in $d_n = x_n$ . . . $ds_{n-1} \times C_1$, and $ds_{n-2} \times C_2$ is also a negative number in $d_n = x_n - C_2 \times ds_{n-2}$. Similarly, when the data one clock or two clocks prior to the $L^{th}$ data '11 . . . 11' is '11 . . . 11', the level of the signal $CTLE_{OUT}$ is decreased by the negative feedback. Accordingly, the control signal generator 1420 generates a tap coefficient control signal $TC_{CTRL}$ for decreasing the tap coefficient $C_1$ (hereinafter referred to as "$C1_{DN}$") and increasing the tap coefficient $C_2$ (hereinafter referred to as "$C2_{DN}$"), and transmits the same to the DFE 1200.

Still referring to FIG. 18B, the level of the output signal $DFE_{OUT}$ of the decision feedback equalizer corresponding to the $M^{th}$ data '11 . . . 11' is smaller than the updated data level lower limit $UDL_{NL}$. Since the data one clock prior to the $M^{th}$ data '11 . . . 11' and the data two clocks prior to the $M^{th}$ data '11 . . . 11' are both '11 . . . 11', it can be interpreted that the signal $CTLE_{OUT}$ is over-compensated such that the post-cursor in the signal $CTLE_{OUT}$ is excessively removed due to excessively large tap coefficients $C_1$ and $C_2$. Accordingly, the control signal generator 1420 generates a tap coefficient control signal $TC_{CTRL}$ for decreasing the tap coefficients $C_1$ and $C_2$ ("$C1_{DN}$" and "$C2_{DN}$"), and transmits the same to the DFE 1200.

Figure 18C:
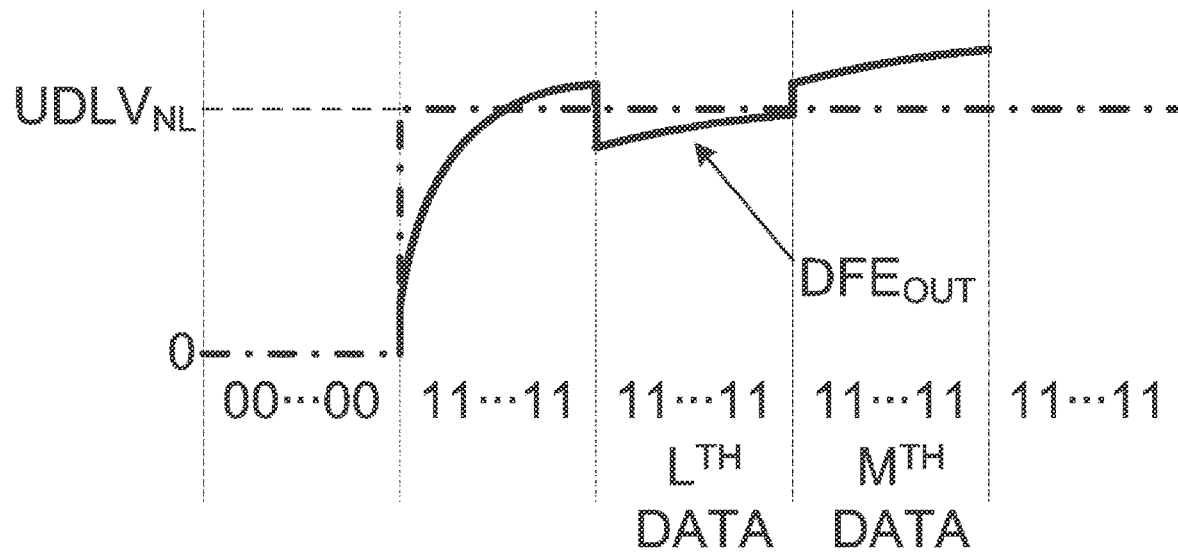

FIG. 18C illustrates an example wherein the output signal $DFE_{OUT}$ corresponding to the $L^{th}$ data is smaller than the updated data level lower limits $UDLV_{NL}$ and the output signal $DFE_{OUT}$ corresponding to the $M^{th}$ data is greater than the updated data level lower limits $UDLV_{NL}$. As shown in FIG. 18C, the level of the output signal $DFE_{OUT}$ corresponding to the $L^{th}$ data '11 . . . 11' is smaller than the updated data level lower limit $UDLV_{NL}$. Since the data one clock prior to the $L^{th}$ data '11 . . . 11' is '11 . . . 11', it can be interpreted that the signal $CTLE_{OUT}$ is over-compensated such that the post-cursor in the signal $CTLE_{OUT}$ is excessively removed due to excessively large tap coefficient $C_1$. Moreover, since the data two clocks prior to the L data '11 . . . 11' is '00 . . . 00', it can be interpreted that the signal $CTLE_{OUT}$ is under-compensated such that the level of the signal $CTLE_{OUT}$ is insufficiently increased by the DFE 1200 due to excessively small tap coefficient $C_2$. Accordingly, the control signal generator 1420 generates a tap coefficient control signal $TC_{CTRL}$ for decreasing the tap coefficient $C_1$ (hereinafter referred to as "$C1_{DN}$") and increasing the tap coefficient $C_2$ (hereinafter referred to as "$C2_{UP}$"), and transmits the same to the DFE 1200.

Still referring to FIG. 18C, the level of the output signal $DFE_{OUT}$ corresponding to the $M^{th}$ data '11 . . . 11' is greater than the updated data level lower limit $UDLV_{NL}$. Since the data one clock prior to the $M^{th}$ data '11 . . . 11' and the data two clocks prior to the $M^{th}$ data '11 . . . 11' are both '11 . . . 11', it can be interpreted that the signal $CTLE_{OUT}$ is under-compensated such that the post-cursor in the signal $CTLE_{OUT}$ is insufficiently removed due to excessively small tap coefficients $C_1$ and $C_2$. Accordingly, the control signal generator 1420 generates a tap coefficient control signal $TC_{CTRL}$ for increasing the tap coefficients $C_1$ and $C_2$ ("$C1_{UP}$" and "$C2_{UP}$"), and transmits the same to the DFE 1200.

Figure 18D:
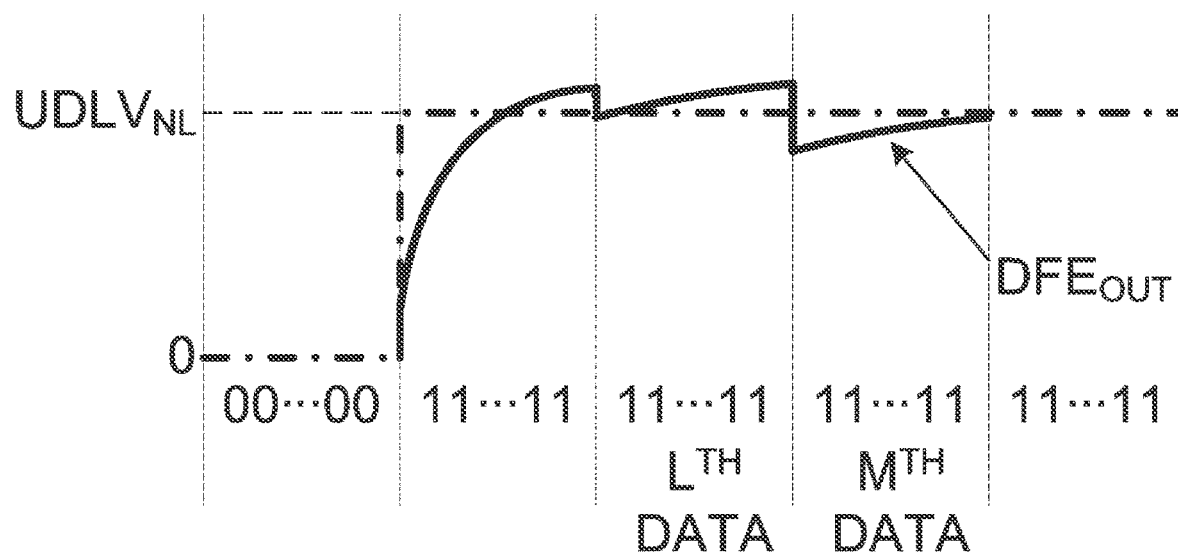

FIG. 18D illustrates an example wherein the output signal $DFE_{OUT}$ corresponding to the $L_{th}$ data is greater than the updated data level lower limits $UDLV_{NL}$ and the output signal $DFE_{OUT}$ corresponding to the $M^{th}$ data is smaller than the updated data level lower limits $UDLV_{NL}$. As shown in FIG. 18D, the level of the output signal $DFE_{OUT}$ of the decision feedback equalizer corresponding to the $L^{th}$ data '11 . . . 11' is greater than the updated data level lower limit $UDLV_{NL}$. Since the data one clock prior to the $L^{th}$ data '11 . . . 11' is '11 . . . 11', it can be interpreted that the signal $CTLE_{OUT}$ is under-compensated such that the post-cursor in the signal $CTLE_{OUT}$ is insufficiently removed due to excessively small tap coefficient $C_1$. Moreover, since the data two clocks prior to the $L^{th}$ data '11 . . . 11' is '00 . . . 00', it can be interpreted that the signal $CTLE_{OUT}$ is over-compensated such that the level of the signal $CTLE_{OUT}$ is excessively increased by the DFE 1200 due to excessively large tap coefficient $C_2$. Accordingly, the control signal generator 1420 generates a tap coefficient control signal $TC_{CTRL}$ for increasing the tap coefficient $C_1$ (hereinafter referred to as "$C1_{UP}$") and decreasing the tap coefficient $C_2$ (hereinafter referred to as "$C2_{DN}$"), and transmits the same to the DFE 1200.

Still referring to FIG. 18D, the level of the output signal $DFE_{OUT}$ of the decision feedback equalizer corresponding to the $M^{th}$ data '11 . . . 11' is smaller than the updated data level lower limit $UDLV_{NL}$. Since the data one clock prior to the $M^{th}$ data '11 . . . 11' and the data two clocks prior to the $M^{th}$ data '11 . . . 11' are both '11 . . . 11', it can be interpreted that the signal $CTLE_{OUT}$ is over-compensated such that the post-cursor in the signal $CTLE_{OUT}$ is excessively removed due to excessively large tap coefficients $C_1$ and $C_2$. Accordingly, the control signal generator 1420 generates a tap coefficient control signal $TC_{CTRL}$ for decreasing the tap coefficients $C_1$ and $C_2$ ("$C1_{DN}$" and "$C2_{DN}$"), and transmits the same to the DFE 1200.

Figure 18E:
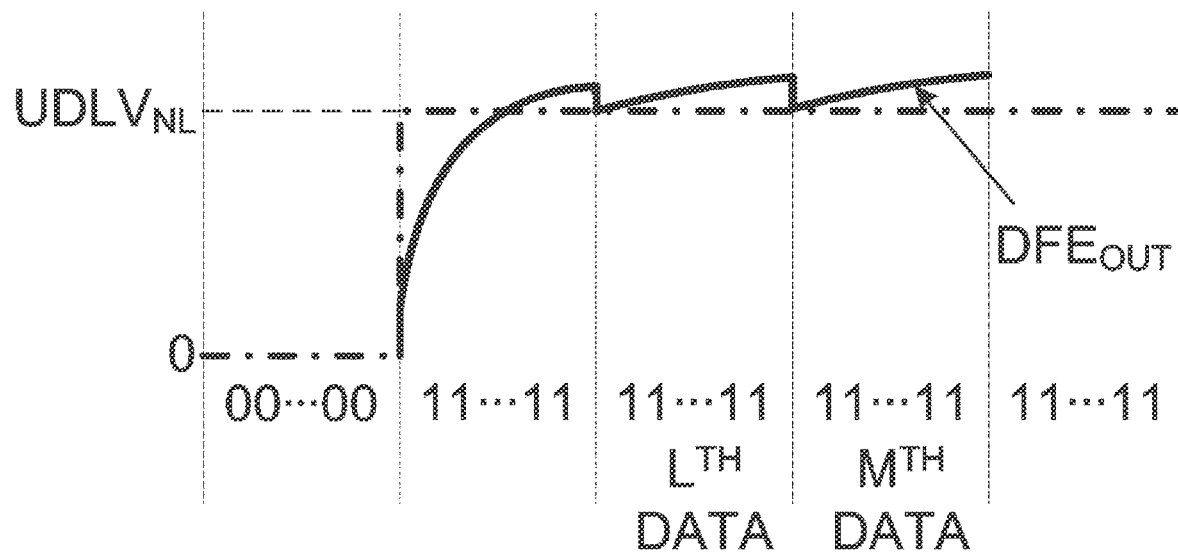

FIG. 18E illustrates an example wherein the output signals $DFE_{out}$ corresponding to the $L^{th}$ data and the $M^{th}$ data are greater than the updated data level lower limits $UDLV_{NL}$. As shown in FIG. 18E, the level of the output signal $DFE_{OUT}$ of the decision feedback equalizer corresponding to the $L^{th}$ data '11 . . . 11' is greater than the updated data level lower limit $UDLV_{NL}$. Since the data one clock prior to the $L^{th}$ data '11 . . . 11' is '11 . . . 11', it can be interpreted that the signal $CTLE_{OUT}$ is under-compensated such that the post-cursor in the signal $CTLE_{OUT}$ is insufficiently removed due to excessively small tap coefficient $C_1$. Moreover, since the data two clocks prior to the $L^{th}$ data '11 . . . 11' is '00 . . . 00', it can be interpreted that the signal $CTLE_{OUT}$ is over-compensated such that the level of the signal $CTLE_{OUT}$ is excessively increased by the DFE 1200 due to excessively large tap coefficient $C_2$. Accordingly, the control signal generator 1420 generates a tap coefficient control signal $TC_{CTRL}$ for increasing the tap coefficient $C_1$ (hereinafter referred to as "$C1_{UP}$") and decreasing the tap coefficient $C_2$ (hereinafter referred to as "$C2_{DN}$"), and transmits the same to the DFE 1200.

Still referring to FIG. 18E, the level of the output signal $DFE_{OUT}$ of the decision feedback equalizer corresponding to the $M^{th}$ data '11 . . . 11' is greater than the updated data level lower limit $UDLV_{NL}$. Since the data one clock prior to the $M^{th}$ data '11 . . . 11' and the data two clocks prior to the $M^{th}$ data '11 . . . 11' are both '11 . . . 11', it can be interpreted that the signal $CTLE_{OUT}$ is under-compensated such that the post-cursor in the signal $CTLE_{OUT}$ is insufficiently removed due to excessively small tap coefficients $C_1$ and $C_2$. Accordingly, the control signal generator 1420 generates a tap coefficient control signal $TC_{CTRL}$ for increasing the tap coefficients $C_1$ and $C_2$ ("$C1_{UP}$" and "$C2_{UP}$"), and transmits the same to the DFE 1200.

The examples described above with reference to FIGS. 18B through 18E may be summarized in Table 1 below.

TABLE 1

| | Level comparison | C1↑↓ | C2↑↓ |
|---|---|---|---|
| FIG. 18B | $DFE_{OUT} < DLV_{NL}$ ($L^{th}$ data) | $C1_{DN}$ | $C2_{UP}$ |
| | $DFE_{OUT} < DLV_{NL}$ ($M^{th}$ data) | $C1_{DN}$ | $C2_{DN}$ |
| FIG. 18C | $DFE_{OUT} < DLV_{NL}$ ($L^{th}$ data) | $C1_{DN}$ | $C2_{UP}$ |
| | $DFE_{OUT} > DLV_{NL}$ ($M^{th}$ data) | $C1_{UP}$ | $C2_{UP}$ |
| FIG. 18D | $DFE_{OUT} > DLV_{NL}$ ($L^{th}$ data) | $C1_{UP}$ | $C2_{DN}$ |
| | $DFE_{OUT} < DLV_{NL}$ ($M^{th}$ data) | $C1_{DN}$ | $C2_{DN}$ |
| FIG. 18E | $DFE_{OUT} > DLV_{NL}$ ($L^{th}$ data) | $C1_{UP}$ | $C2_{DN}$ |
| | $DFE_{OUT} > DLV_{NL}$ ($L^{th}$ data) | $C1_{UP}$ | $C2_{UP}$ |

As shown in Table 1, the control signal generator 1420 generates the tap coefficient control signal $TC_{CTRL}$ for increasing or decreasing the tap coefficients $C_1$ and $C_2$, respectively, and transmits the generated tap coefficient control signal $TC_{CTRL}$ to the DFE 1200.

Here, the increase/decrease of the tap coefficients $C_1$ and $C_2$ may be performed using only the $L^{th}$ data or may be performed using both the $L^{th}$ data and the $M^{th}$ data.

In one embodiment, in the case of the waveform shown in FIG. 18B, the control signal generator 1420 may adjust the tap coefficient of the DFE 1200 with a tap coefficient control signal $TC_{CTRL}$ including only $C1_{DN}$ and $C2_{UP}$ that corresponds to $L^{th}$ data. In another embodiment, in the case of the waveform shown in FIG. 18B, since $C2_{UP}$ and $C2_{DN}$ cancel each other and $C1_{DN}$ occurs twice, the control signal generator 1420 uses a tap coefficient control signal $TC_{CTRL}$ including $C1_{DN}$ to adjust only the tap coefficient $C_1$ of the DFE 1200.

Referring back to FIG. 14, a first initial data level $IDL_1$ through an $N^{th}$ initial data level $IDL_N$ are calculated from the updated data level upper limit $UDLV_{NH}$ and the updated data level lower limit $UDLV_{NL}$ (S600).

Hereinafter, step S600 will be described in detail with reference to FIG. 19.

Figure 19:
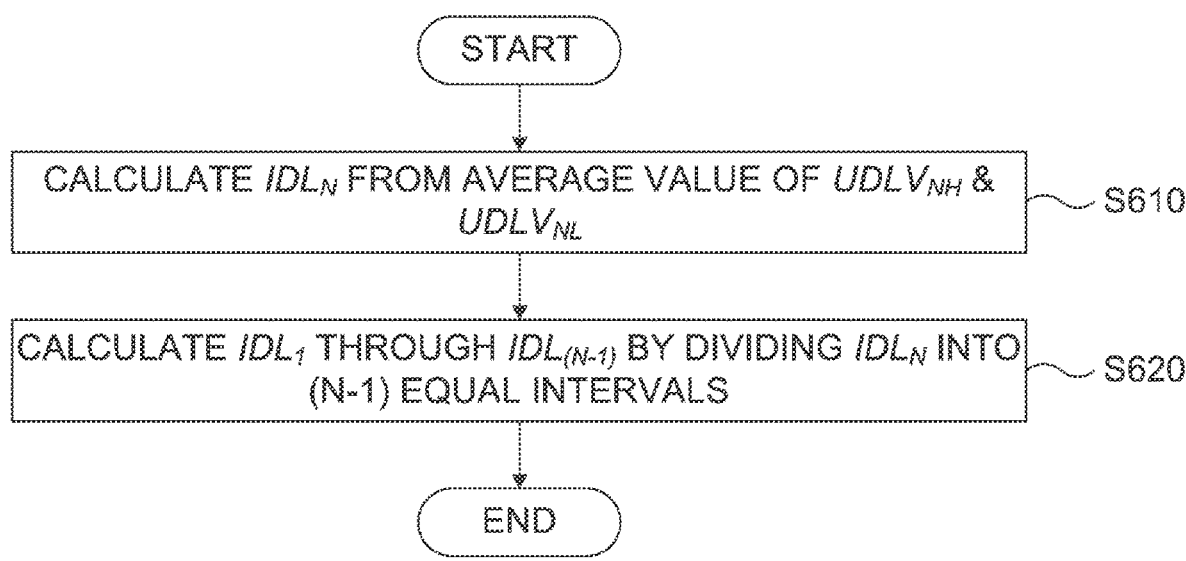
FIG. 19 is a flowchart illustrating step S600 in detail.

FIG. 19 is a flowchart illustrating step S600 in detail.

Referring to FIG. 19, the control signal generator 1420 calculates the $N^{th}$ initial data level $IDL_N$ from the average value of the updated data level upper limit $UDLV_{NH}$ and the updated data level lower limit $UDLV_{NL}$ as in equation 3 above (S610).

Thereafter, the control signal generator 1420 calculates the first initial data levels $IDL_1$ through the $(N-1)^{th}$ initial data level $IDL_{(N-1)}$ by dividing the $N^{th}$ initial data level $IDL_N$ into (N-1) equal intervals as in equation 4 above (S620).

Referring back to FIG. 14, the first initial threshold voltage $IV_{TH1}$ through the $(N-1)^{th}$ initial threshold voltage $IV_{TH(N-1)}$ are calculated from the first initial data level $IDL_1$ through the $N^{th}$ initial data level $IDL_B$ as in equation 5 above (S700).

Steps S100 through S700 may be repeatedly performed when the training data pattern is repeated transmitted.

The method of training an equalizer system according to the present invention has the following advantages.

(1) The method of training an equalizer system according to the present invention is advantageous in that accurate data reception is possible since the equalizer system is tuned using the training data pattern before it is used for actual communication.

(2) The method of training an equalizer system according to the present invention is advantageous in that the continuous-time linear equalizer, decision feedback equalizer and sampler of the equalizer system may be optimized enabling accurate long-distance, high-speed communication.

What is claimed is:

1. A method of training an equalizer system of a PAM-N (N-level pulse amplitude modulation) receiver comprising a linear equalizer equalizing a received signal and a decision feedback equalizer equalizing an output signal of the linear equalizer, the method comprising:
   (a) receiving and equalizing a first training pattern and a second training pattern, wherein the first training pattern comprises a first data '00 . . . 00', a data '11 . . . 11' and a second data '00 . . . 00' arranged in order, and the second training pattern comprises a first data '11 . . . 11' through a $K^{th}$ data '11 . . . 11' consecutively arranged after the second data '00 . . . 00' (where K is a natural number equal to or greater than 2);
   (b) generating an updated data level upper limit $UDLV_{NH}$ and an updated data level lower limit $UDLV_{NL}$ by increasing or decreasing a data level upper limit $DLV_{NH}$ based on a result of a comparison between: a first level of an output signal $DFE_{OUT}$ of the decision feedback equalizer corresponding to the data '11 . . . 11' of the first training pattern; and the data level upper limit $DLV_{NH}$;
   (c) increasing or decreasing a high-frequency amplification gain of the linear equalizer based on a result of a comparison between: a second level of an output signal $DFE_{OUT}$ of the decision feedback equalizer corresponding to the first data '11 . . . 11'; and the updated data level upper limit $UDLV_{NH}$ when a transition from the second data '00 . . . 00' to the first data '11 . . . 11' occurs; and (d) increasing or decreasing a low-frequency amplification gain of the linear equalizer based on a result of a comparison between: a third level of an output signal $DFE_{OUT}$ of the decision feedback equalizer corresponding to the second data '11 . . . 11' through the $K^{th}$ data '11 . . . 11'; and the updated data level lower limit $UDLV_{NL}$.

2. The method of claim 1, wherein (b) comprises:

(b-1) increasing the data level upper limit $DLV_{NH}$ to generate the updated data level upper limit $UDLV_{NH}$ when the first level is greater than the data level upper limit $DLV_{NH}$;

(b-2) decreasing the data level upper limit $DLV_{NH}$ to generate the updated data level upper limit $UDLV_{NH}$ when the first level is smaller than the data level upper limit $DLV_{NH}$; and (b-3) generating the updated data level lower limit $UDLV_{NL}$ from the updated data level upper limit $UDLV_{NH}$.

3. The method of claim 1, wherein (c) comprises:

(c-1) decreasing the high-frequency amplification gain of the linear equalizer when the second level is greater than the updated data level upper limit $UDLV_{NH}$ when the transition occurs; and (c-2) increasing the high-frequency amplification gain of the linear equalizer when the second level is smaller than the updated data level upper limit $UDLV_{NH}$ when the transition occurs.

4. The method of claim 1, wherein (d) comprises:

(d-1) decreasing the low-frequency amplification gain of the linear equalizer when the third level is greater than the updated data level lower limit $UDLV_{NL}$; and (d-2) increasing the low-frequency amplification gain of the linear equalizer when the third level is smaller than the updated data level lower limit $UDLV_{NL}$.

5. The method of claim 1, further comprising: increasing or decreasing a tap coefficient of the decision feedback equalizer based on a result of a comparison between: a fourth level of an output signal $DVE_{OUT}$ of the decision feedback equalizer corresponding to one or more data '11 . . . 11' selected from the first data '11 . . . 11' through the $K^{th}$ data '11 . . . 11' of the second training pattern; and the updated data level lower limit $UDLV_{NL}$.

6. The method of claim 5, wherein the decision feedback equalizer comprises a 2-tap decision feedback equalizer, the one or more data '11 . . . 11' comprise an $L^{th}$ data '11 . . . 11'; and (e) comprises: (e-1) increasing or decreasing tap coefficients $C_1$ and $C_2$ based on a result of comparison between: a level of an output signal $DFE_{OUT}$ of the decision feedback equalizer corresponding to the $L^{th}$ data '11 . . . 11'; and the updated data level lower limit $UDLV_{NL}$ (where L is a natural number satisfying $1 \leq L \leq K$).

7. The method of claim 6, wherein the one or more data '11 . . . 11' further comprise an $M^{th}$ data '11 . . . 11', and (e) further comprises: (e-2) increasing or decreasing tap coefficients $C_1$ and $C_2$ based on a result of comparison between: a level of an output signal $DFE_{OUT}$ of the decision feedback equalizer corresponding to the $M^{th}$ data '11 . . . 11'; and the updated data level lower limit $UDLV_{NL}$ (where $L \neq M$ and M is a natural number satisfying $1 \leq M \leq K$).

8. The method of claim 1, further comprising:

(f) calculating a first initial data level $IDL_1$ through an $N^{th}$ initial data level $IDL_N$ from the updated data level upper limit $UDLV_{NH}$ and the updated data level lower limit $UDLV_{NL}$; and (g) calculating a first initial threshold voltage $IV_{TH1}$ through an $(N-1)^{th}$ initial threshold voltage $IV_{TH(N-1)}$ from the first initial data level $IDL_1$ through the $N^{th}$ initial data level $IDL_N$.

9. The method of claim 8, wherein (f) comprises:

(f-1) calculating the $N^{th}$ initial data level $IDL_N$ from an average value of the updated data level upper limit $UDLV_{NH}$ and the updated data level lower limit $UDLV_{NL}$; and (f-2) calculating the first initial data level $IDL_1$ through $(N-1)^{th}$ initial data level $IDL_{(N-1)}$ by dividing the $N^{th}$ initial data level $IDL_N$ into $(N-1)$ equal intervals.

10. The method of claim 9, wherein (g) comprises: calculating the first initial threshold voltage $IV_{TH1}$ through the $(N-1)^{th}$ initial threshold voltage $IV_{TH(N-1)}$ from the first initial data level $IDL_1$ through the $N^{th}$ initial data level Iam according to equation $$IV_{TH_j} = \frac{IDL_j + IDL_{(j+1)}}{2},$$

where j is a natural number satisfying $1 \leq j \leq (N-1)$.

* * * * *

UNITED STATES PATENT AND TRADEMARK OFFICE
CERTIFICATE OF CORRECTION

Page 1 of 1

PATENT NO. : 11,765,003 B2
APPLICATION NO. : 17/832928
DATED : September 19, 2023
INVENTOR(S) : Yo-Han Kim et al.

It is certified that error appears in the above-identified patent and that said Letters Patent is hereby corrected as shown below:

On the Title Page

Item (30) the Foreign Application Priority Data reads:
Feb. 2, 2022 (KR) .................. 10-2022-0017346

Should correctly read as:
Feb. 10, 2022 (KR) .................. 10-2022-0017346

Signed and Sealed this
Seventeenth Day of October, 2023

Katherine Kelly Vidal
*Director of the United States Patent and Trademark Office*